US011196287B2

(12) United States Patent
Matsuzaki

(10) Patent No.: US 11,196,287 B2
(45) Date of Patent: Dec. 7, 2021

(54) REAL-TIME CLOCK MODULE, ELECTRONIC DEVICE, AND VEHICLE

(71) Applicant: SEIKO EPSON CORPORATION, Tokyo (JP)

(72) Inventor: Sho Matsuzaki, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/794,931

(22) Filed: Feb. 19, 2020

(65) Prior Publication Data

US 2020/0274387 A1 Aug. 27, 2020

(30) Foreign Application Priority Data

Feb. 21, 2019 (JP) .............................. JP2019-029425

(51) Int. Cl.
*H02J 9/06* (2006.01)
*G04G 19/10* (2006.01)
*G06F 1/26* (2006.01)
*G05F 1/10* (2006.01)

(52) U.S. Cl.
CPC ................ *H02J 9/06* (2013.01); *G04G 19/10* (2013.01); *G05F 1/10* (2013.01); *G06F 1/263* (2013.01)

(58) Field of Classification Search
CPC ... H02J 9/06; G04G 19/10; G05F 1/10; G06F 1/263
See application file for complete search history.

(56) References Cited

U.S. PATENT DOCUMENTS

| 5,860,125 A | * | 1/1999 | Reents ...................... G06F 1/24 713/320 |
| 6,772,361 B1 | * | 8/2004 | Walsh ....................... G06F 1/14 713/502 |
| 7,734,953 B1 | * | 6/2010 | Sivertsen ............ G06F 11/2015 714/14 |
| 8,072,247 B1 | * | 12/2011 | Wright .................... G06F 13/24 327/143 |
| 9,450,569 B1 | * | 9/2016 | Ansari ...................... G06F 1/14 |

(Continued)

FOREIGN PATENT DOCUMENTS

| JP | 2002-091591 A | 3/2002 |
| JP | 2003-185771 A | 7/2003 |

(Continued)

*Primary Examiner* — Kyle J Moody
(74) *Attorney, Agent, or Firm* — Rankin, Hill & Clark LLP

(57) ABSTRACT

A real-time clock module includes a switch circuit that is electrically coupled to a first node to which a first power supply voltage is applied and a second node to which a second power supply voltage is applied and switches between outputting the first power supply voltage and outputting the second power supply voltage, a power supply detection circuit that detects a voltage value of the first power supply voltage, a switch control circuit that controls the switching of the switch circuit based on an output of the power supply detection circuit, a constant voltage circuit that outputs a constant voltage signal based on the output of the switch circuit, and a current control circuit that controls a current supplied to the constant voltage circuit, in which, when where the switch control circuit switches the switch circuit, the current control circuit increases the current supplied to the constant voltage circuit.

10 Claims, 11 Drawing Sheets

(56) References Cited

U.S. PATENT DOCUMENTS

| | | | | |
|---|---|---|---|---|
| 10,013,042 B1* | 7/2018 | Abhishek | .............. | G06F 1/3275 |
| 2006/0047991 A1* | 3/2006 | Leung | ................... | G06F 1/04 |
| | | | | 713/500 |
| 2009/0022013 A1* | 1/2009 | Shirotori | .................. | G06F 1/14 |
| | | | | 368/10 |
| 2012/0261994 A1* | 10/2012 | Nikolov | ................... | H02J 9/04 |
| | | | | 307/66 |
| 2013/0265116 A1* | 10/2013 | Su | ........................ | H03L 3/00 |
| | | | | 331/158 |
| 2013/0313904 A1* | 11/2013 | Kayama | .................. | G06F 1/26 |
| | | | | 307/26 |
| 2014/0008984 A1 | 1/2014 | Kamiyama et al. | | |
| 2015/0097726 A1* | 4/2015 | Babitch | ................... | G01S 19/23 |
| | | | | 342/357.62 |
| 2015/0286846 A1* | 10/2015 | Prakash | .............. | G01R 22/066 |
| | | | | 726/34 |
| 2016/0085280 A1* | 3/2016 | Harel | ..................... | G06F 1/266 |
| | | | | 710/14 |
| 2016/0118884 A1* | 4/2016 | Fernald | ................ | G06F 1/3287 |
| | | | | 323/268 |
| 2017/0063305 A1* | 3/2017 | Shirotori | .................. | H03L 1/04 |
| 2017/0063380 A1* | 3/2017 | Shirotori | ................. | H03B 5/32 |
| 2018/0081412 A1* | 3/2018 | Sato | ........................ | G06F 1/26 |
| 2019/0101951 A1* | 4/2019 | Sather | ..................... | G06F 1/26 |

FOREIGN PATENT DOCUMENTS

| | | |
|---|---|---|
| JP | 2009-219176 A | 9/2009 |
| JP | 2014-017965 A | 1/2014 |

* cited by examiner

REAL-TIME CLOCK MODULE, ELECTRONIC DEVICE, AND VEHICLE

The present application is based on, and claims priority from JP Application Serial Number 2019-029425, filed Feb. 21, 2019, the disclosure of which is hereby incorporated by reference herein in its entirety.

BACKGROUND

1. Technical Field

The present disclosure relates to a real-time clock module, an electronic device, and a vehicle.

2. Related Art

A real-time clock module is a circuit having a timekeeping function, and is incorporated in various electronic devices such as a personal computer. In general, the timekeeping function built into the real-time clock module is required to continue to operate even when a main power is not supplied to an electronic device or when the main power is not supplied temporarily due to an instantaneous power failure or the like. For this reason, the electronic device is provided with a circuit that detects that the main power supply is cut off and switches the power supply of the real-time clock module to a backup power supply.

For example, JP-A-2014-017965 discloses a real-time clock device that includes a main power supply and a backup power supply and can quickly switch to the backup power supply when the main power supply is cut off.

However, when the power of the real-time clock module is switched, the voltage value of the power supply input to the real-time clock module changes before and after switching due to the potential difference between the main power supply and the backup power supply. In a case where an internal constant voltage circuit that generates an internal voltage of the real time clock module cannot follow up the change in the voltage value of the power supply input to the real time clock module, the voltage value of the internal voltage may change temporarily.

SUMMARY

An aspect of a real-time clock module according to the present disclosure includes a first node to which a first power supply voltage is applied, a second node to which a second power supply voltage is applied, a switch circuit that is electrically coupled to the first node and the second node and switches between outputting the first power supply voltage and outputting the second power supply voltage, a power supply detection circuit that detects a voltage value of the first power supply voltage, a switch control circuit that controls the switching of the switch circuit based on an output of the power supply detection circuit, a constant voltage circuit that outputs a constant voltage signal based on the output of the switch circuit, and a current control circuit that controls a current supplied to the constant voltage circuit, in which, when the switch control circuit switches the switch circuit, the current control circuit increases the current supplied to the constant voltage circuit.

In the aspect of the real-time clock module, after the current control circuit increases the current supplied to the constant voltage circuit, the switch control circuit may switch the switch circuit.

The aspect of the real-time clock module may further include a first power-on reset circuit that outputs a first reset signal to the switch control circuit and the current control circuit, in which the constant voltage signal may be input to the first power-on reset circuit.

In the aspect of the real-time clock module, the constant voltage circuit may include a first transistor that controls a supplied current, and a second transistor that has a larger driving capability than the first transistor, when the current supplied to the constant voltage circuit is increased, the current control circuit may control the first transistor and the second transistor to be turned on, and when the current supplied to the constant voltage circuit is not increased, the current control circuit may control the first transistor to be turned on and the second transistor to be turned off.

The aspect of the real-time clock module may further include a second power-on reset circuit that outputs a second reset signal in accordance with the voltage value of the first power supply voltage, in which the current control circuit controls the current supplied to the constant voltage circuit based on the second reset signal.

An aspect of an electronic device according to the present disclosure includes the aspect of the real-time clock module.

An aspect of a vehicle according to the present disclosure includes the aspect of the real-time clock module.

DESCRIPTION OF EXEMPLARY EMBODIMENTS

Hereinafter, preferred embodiments of the present disclosure will be described with reference to drawings. The drawings used are for convenience of description. The embodiments described below do not unduly limit the contents of the present disclosure described in the appended claims. Also, not all of the configurations described below are essential constituent requirements of the present disclosure.

Figure 1:
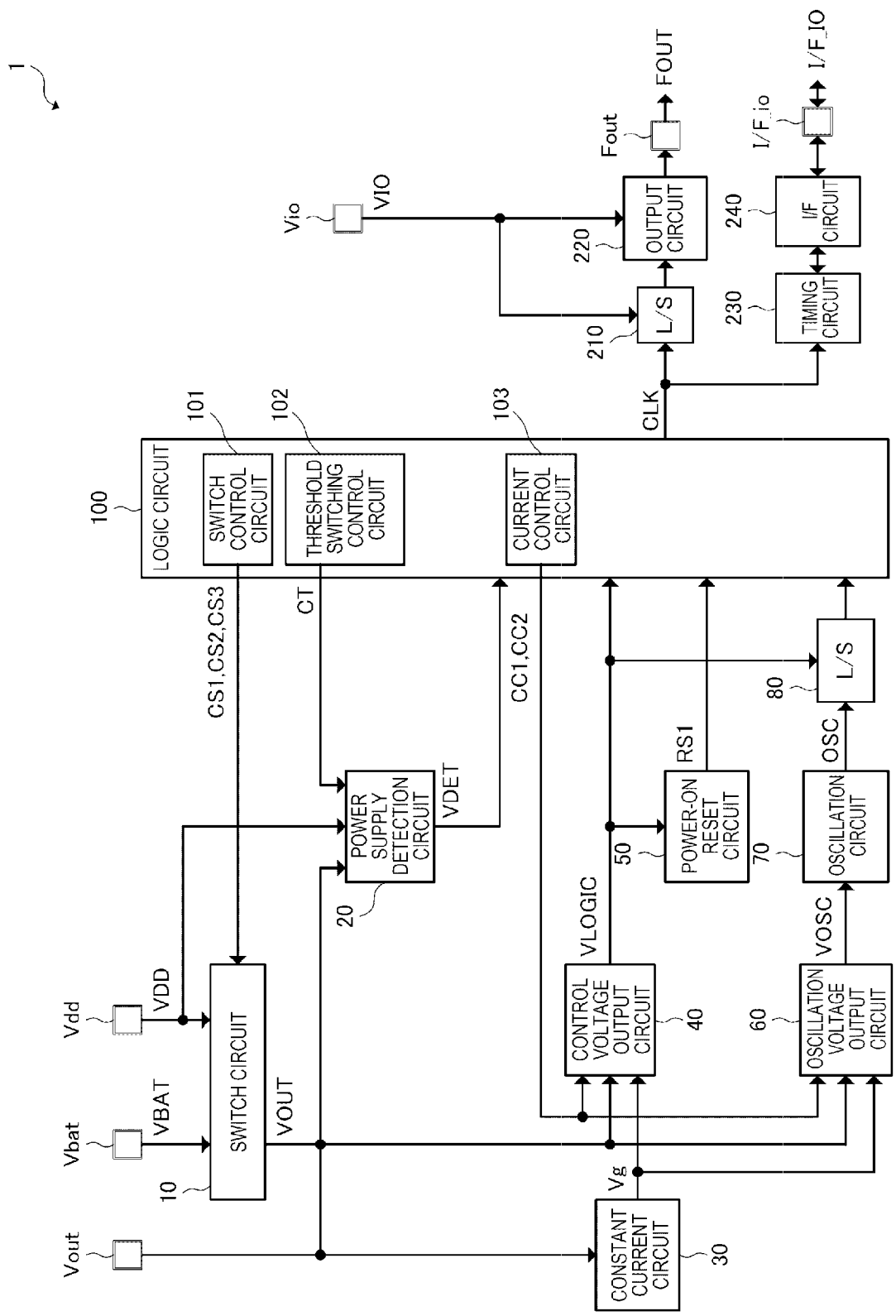
FIG. 1 is a diagram illustrating a configuration of a real-time clock module according to a first embodiment.

1. Real-Time Clock Module
1.1 First Embodiment
1.1.1 Configuration of Real-Time Clock Module FIG. 1 is a diagram illustrating a configuration of a real-time clock (RTC) module 1 according to a first embodiment. The RTC module 1 includes a switch circuit 10, a power supply detection circuit 20, a constant current circuit 30, a control voltage output circuit 40, a power-on reset circuit 50, an oscillation voltage output circuit 60, an oscillation circuit 70, a level shifter (L/S) 80, a logic circuit 100, a level shifter (L/S) 210, an output circuit 220, a timing circuit 230, and an interface (I/F) circuit 240. Further, the RTC module 1 is provided with terminals Vbat, Vout, Vdd, Vio, Fout, and I/F_io that couple the RTC module 1 with the outside. The RTC module 1 may have a configuration in which some of these elements are omitted or changed, or other elements are added.

The RTC module 1 configured as described above operates by using the voltage VDD as a main power input from the terminal Vdd or the voltage VBAT as a backup power input from the terminal Vbat as power supply voltages. The RTC module 1 outputs a pulse signal having a predetermined frequency based on an oscillation signal OSC having a predetermined frequency output from the oscillation circuit 70, and generates and outputs timing data based on the pulse signal. Here, the voltage VDD may be, for example, a voltage generated based on a commercial power supply, a voltage output from a non-chargeable primary battery, a voltage output from a rechargeable secondary battery, or the like, and the voltage VBAT may be a voltage output from a primary battery, a voltage output from a secondary battery, a voltage output from a large-capacity capacitor based on the charge stored in the capacitor, or the like.

The switch circuit 10 receives the voltages VDD and VBAT and power supply switching control signals CS1, CS2 and CS3. The switch circuit 10 is electrically coupled to the terminal Vdd and the terminal Vbat, and switches between outputting the voltage VDD as a voltage VOUT or outputting the voltage VBAT as the voltage VOUT based on the power supply switching control signals CS1, CS2, and CS3.

Figure 2:
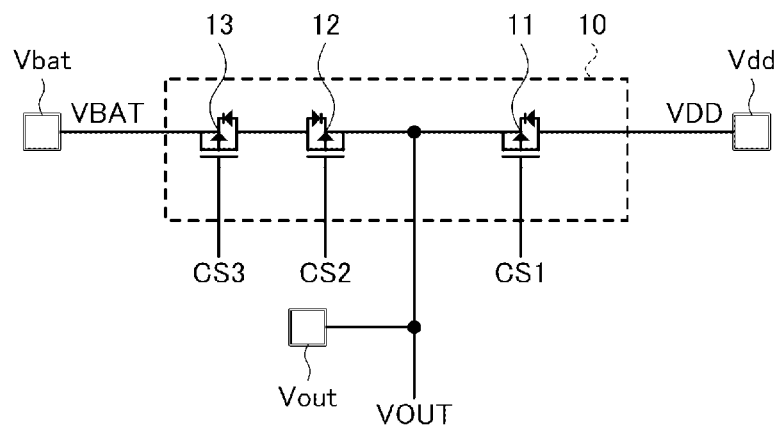
FIG. 2 is a diagram illustrating a configuration of a switch circuit.

Here, an example of the configuration of the switch circuit 10 will be described with reference to FIG. 2. FIG. 2 is a diagram illustrating the configuration of the switch circuit 10. As illustrated in FIG. 2, the switch circuit 10 includes transistors 11, 12, and 13. The transistors 11, 12, and 13 of the present embodiment are assumed to be P-channel MOS transistors.

The power supply switching control signal CS1 is input to the gate of the transistor 11. The source of the transistor 11 is coupled to the terminal Vdd. The drain of the transistor 11 is coupled to the terminal Vout. The back gate of the transistor 11 is coupled to the drain of the transistor 11. Thereby, the transistor 11 controls the source and the drain to be conductive when an L-level power supply switching control signal CS1 is input, and controls the source and the drain to be non-conductive when an H level power supply switching control signal CS1 is input. In the following description, a state where the source and drain of the transistor 11 are conductive may be referred to as "on", and a state where the source and drain are not conductive may be referred to as "off".

The power supply switching control signal CS2 is input to the gate of the transistor 12. The source of the transistor 12 is coupled to the drain of the transistor 13. The drain of the transistor 12 is coupled to the terminal Vout. The back gate of the transistor 12 is coupled to the drain of the transistor 12. Thereby, the transistor 12 controls the source and the drain to be conductive when an L-level power supply switching control signal CS2 is input, and controls the source and the drain to be non-conductive when an H level power supply switching control signal CS2 is input. In the following description, a state where the source and drain of the transistor 12 are conductive may be referred to as "on", and a state where the source and drain are not conductive may be referred to as "off".

The power supply switching control signal CS3 is input to the gate of the transistor 13. The source of the transistor 13 is coupled to the terminal Vbat. The drain of the transistor 13 is coupled to the source of the transistor 12. The back gate of the transistor 13 is coupled to the source of the transistor 13. Thereby, the transistor 13 controls the conduction between the source and the drain when an L-level power supply switching control signal CS3 is input, and controls the non-conduction between the source and the drain when an H level power supply switching control signal CS3 is input. In the following description, a state where the source and drain of the transistor 13 are conductive may be referred to as "on", and a state where the source and drain are not conductive may be referred to as "off".

That is, the transistor 11 switches whether or not to output the voltage VDD supplied to the terminal Vdd as the voltage VOUT to the terminal Vout based on the logic level of the power supply switching control signal CS1, and the transistors 12 and 13 switch whether or not to output the voltage VBAT supplied to the terminal Vbat to the terminal Vout as the voltage VOUT based on the respective logic levels of the power supply switching control signals CS2 and CS3.

As described above, the switch circuit 10 switches between outputting the voltage VDD to the terminal Vout as the voltage VOUT and outputting the voltage VBAT to the terminal Vout as the voltage VOUT by controlling the transistors 11, 12, and 13 based on the power supply switching control signals CS1, CS2, and CS3. The switch circuit 10 according to the embodiment outputs the voltage VDD as the voltage VOUT when the power supply switching control signals CS1, CS2, and CS3 are L, H, and H level signals, respectively, and outputs the voltage VBAT as the voltage VOUT when the power supply switching control signals CS1, CS2, and CS3 are H, L, and L level signals, respectively.

Further, a diode having the source side as an anode and the drain side as a cathode is formed between the source and drain of the transistor 11. Thereby, when the transistor 11 is controlled to be turned off, supply of the current and voltage from the terminal Vout to the terminal Vdd is cut off. In other words, it is possible to reduce the possibility of a current flowing back to the terminal Vdd by controlling the transistor 11 to be turned off based on the power supply switching control signal CS1.

Further, a diode having the source side as an anode and the drain side as a cathode is formed between the source and drain of the transistor 12. Thereby, when the transistor 12 is controlled to be turned off, supply of the current and voltage from the terminal Vout to the terminal Vbat is cut off. Therefore, when the transistor 12 is controlled to be turned off, overcharging of the voltage VBAT as the backup power supply can be prevented.

Further, a diode having the source side cathode and the drain side anode is formed between the source and drain of the transistor 13. Thereby, when the transistor 13 is controlled to be turned off, supply of the current and voltage from the terminal Vbat to the terminal Vout is cut off. Therefore, when the transistor 13 is controlled to be turned off, wasteful power consumption in the backup power supply can be reduced.

Here, the voltage VDD is an example of a first power supply voltage, and the terminal Vdd to which the voltage VDD is applied is an example of a first node. The voltage VBAT is an example of a second power supply voltage, and the terminal Vbat to which the voltage VBAT is applied is an example of a second node. A wiring that propagates the voltage VDD and couples the terminal Vdd and the source of the transistor 11 is also an example of the first node in a broad sense, and a wiring that propagates the voltage VBAT and couples the terminal Vbat and the source of the transistor 13 is also an example of the second node in a broad sense.

In the embodiment, as illustrated in FIG. 2, the switch circuit 10 switches between outputting the voltage VDD as the voltage VOUT or outputting the voltage VBAT by controlling the three transistors 11, 12, and 13, but the switch circuit 10 is not limited to this configuration. For example, the switch circuit 10 does not include the transistor 13 and may control whether to output the voltage VDD as the voltage VOUT or the voltage VBAT by controlling the transistors 11 and 12. Furthermore, the switch circuit 10 does not include the transistors 12 and 13 and may control whether to output the voltage VDD as the voltage VOUT or the voltage VBAT by controlling the transistor 11.

A capacitor (not illustrated) is attached to the terminal Vout. As a result, the voltage value of the voltage VOUT generated at the terminal Vout can be stabilized.

Returning to FIG. 1, the power supply detection circuit 20 receives the voltages VDD and VOUT and a threshold control signal CT. The power supply detection circuit 20 detects the voltage value of the voltage VDD. Then, the power supply detection circuit 20 compares the detected voltage value of the voltage VDD with a predetermined threshold and outputs the comparison result as a voltage detection signal VDET.

Figure 3:
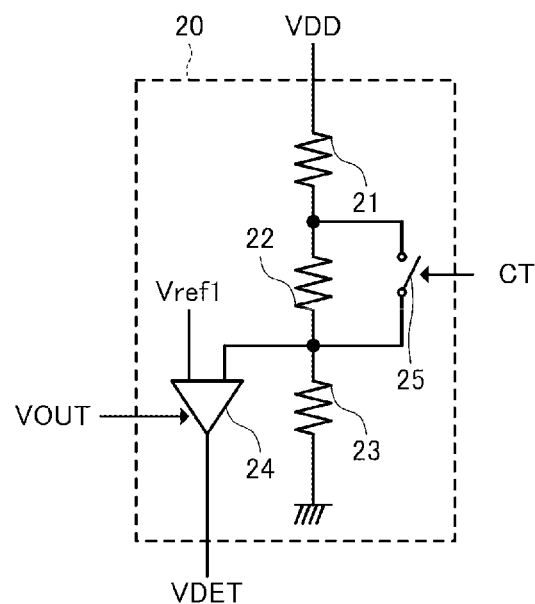
FIG. 3 is a diagram illustrating a configuration of a voltage detection circuit.

Here, an example of the configuration of the power supply detection circuit 20 will be described with reference to FIG. 3. FIG. 3 is a diagram illustrating a configuration of the power supply detection circuit 20. The power supply detection circuit 20 includes resistors 21, 22 and 23, a comparator 24, and a switch 25. The voltage VDD is input to one end of the resistor 21. The other end of the resistor 21 is coupled to one end of the resistor 22. The other end of the resistor 22 is coupled to one end of the resistor 23. The other end of the resistor 23 is coupled to the ground. That is, the resistors 21, 22, and 23 are coupled in series.

One end of the switch 25 is coupled to one end of the resistor 22, and the other end of the switch 25 is coupled to the other end of the resistor 22. That is, the switch 25 is coupled in parallel with the resistor 22. Further, the threshold control signal CT is input to the switch 25 as a control signal. The switch 25 switches whether the switch 25 is turned on or off based on the threshold control signal CT.

The switch 25 of the embodiment will be described as being non-conductive when an H-level threshold control signal CT is input and being conductive when an L-level threshold control signal CT is input. In the following description, the conductive state of the switch 25 may be referred to as "on" and the non-conductive state may be referred to as "off".

The comparator 24 operates by using the voltage VOUT as an operation power supply. The comparator 24 includes two input terminals and one output terminal. One input end of the comparator 24 is coupled to one end of the resistor 23. A reference voltage Vref1 is input to the other input terminal of the comparator 24. The comparator 24 compares the voltage values of the signals input to the two input terminals, generates a voltage detection signal VDET based on the comparison result, and outputs the voltage detection signal VDET from the output terminal. The description will be made assuming that the comparator 24 of the embodiment outputs an H level voltage detection signal VDET when the voltage value input to one input terminal is equal to or higher than the reference voltage Vref1 input to the other input terminal, and the comparator 24 outputs an L level voltage detection signal VDET when the voltage value input to one input terminal is smaller than the reference voltage Vref1 input to the other input terminal.

In a case where the supply of the voltage VDD is stopped, the voltage value input to one input terminal of the comparator 24 is substantially the ground potential. Therefore, the voltage value input to one input terminal of the comparator 24 is smaller than the voltage value of the reference voltage Vref1 input to the other input terminal. Therefore, the power supply detection circuit 20 outputs the L level voltage detection signal VDET. Although details will be described later, in this case, an H level threshold control signal CT is input to the switch 25.

Then, when the supply of the voltage VDD is started, the voltage value of the voltage VDD increases. As the voltage VDD increases, the voltage value input to one input terminal of the comparator 24 also increases. At this time, since the H-level threshold control signal CT is input to the switch 25, the switch 25 is controlled to be turned off. Therefore, a voltage obtained by dividing the voltage VDD by the resistors 21 and 22 and the resistor 23 is input to one input terminal of the comparator 24.

Thereafter, when the voltage value of the voltage VDD rises and the voltage value input to one input terminal of the comparator 24 becomes equal to or higher than the voltage value of the reference voltage Vref1 input to the other input terminal of the comparator 24, the power supply detection circuit 20 outputs an H level voltage detection signal VDET. Then, when the voltage detection signal VDET becomes H level, the threshold control signal CT input to the switch 25 is controlled to L level. Here, when the voltage value of the voltage VDD rises and the voltage value input to one input terminal of the comparator 24 becomes equal to or higher than the voltage value of the reference voltage Vref1 input to the other input terminal of the comparator 24, the voltage value of the voltage VDD is referred to as the threshold voltage VR1.

Thereafter, when the supply of the voltage VDD is stopped, the voltage value of the voltage VDD decreases. As the voltage VDD decreases, the voltage value input to one input terminal of the comparator 24 also decreases. In this case, since the L-level threshold control signal CT is input to the switch 25, the switch 25 is controlled to be turned on. Therefore, a voltage obtained by dividing the voltage VDD by the resistor 21 and the resistor 23 is input to one input terminal of the comparator 24. Thereafter, when the voltage value of the voltage VDD decreases and the voltage value input to one input terminal of the comparator 24 is lower than the voltage value of the reference voltage Vref1 input to the other input terminal of the comparator 24, the power supply detection circuit 20 outputs an L level voltage detection signal VDET. Then, when the voltage detection signal VDET becomes L level, the threshold control signal CT is controlled to H level. Here, when the voltage value of the voltage VDD decreases and the voltage value input to one input terminal of the comparator 24 is lower than the voltage value of the reference voltage Vref1 input to the other input terminal of the comparator 24, the voltage value of the voltage VDD is referred to as the threshold voltage VR2.

Returning to FIG. 1, the voltage VOUT is input to the constant current circuit 30. Then, the constant current circuit 30 generates a current regulation signal Vg for regulating the current supplied to the control voltage output circuit 40 and the oscillation voltage output circuit 60 and outputs the signal to the control voltage output circuit 40 and the oscillation voltage output circuit 60. The control voltage output circuit 40 receives the voltage VOUT, the current regulation signal Vg, and the current control signals CC1 and CC2. The control voltage output circuit 40 converts the voltage VOUT into a constant voltage VLOGIC and outputs the converted voltage to the logic circuit 100. The oscillation voltage output circuit 60 receives the voltage VOUT, the current regulation signal Vg, and the current control signals CC1 and CC2. The oscillation voltage output circuit 60 converts the voltage VOUT into a constant voltage VOSC and outputs the converted voltage to the oscillation circuit 70.

Figure 4:
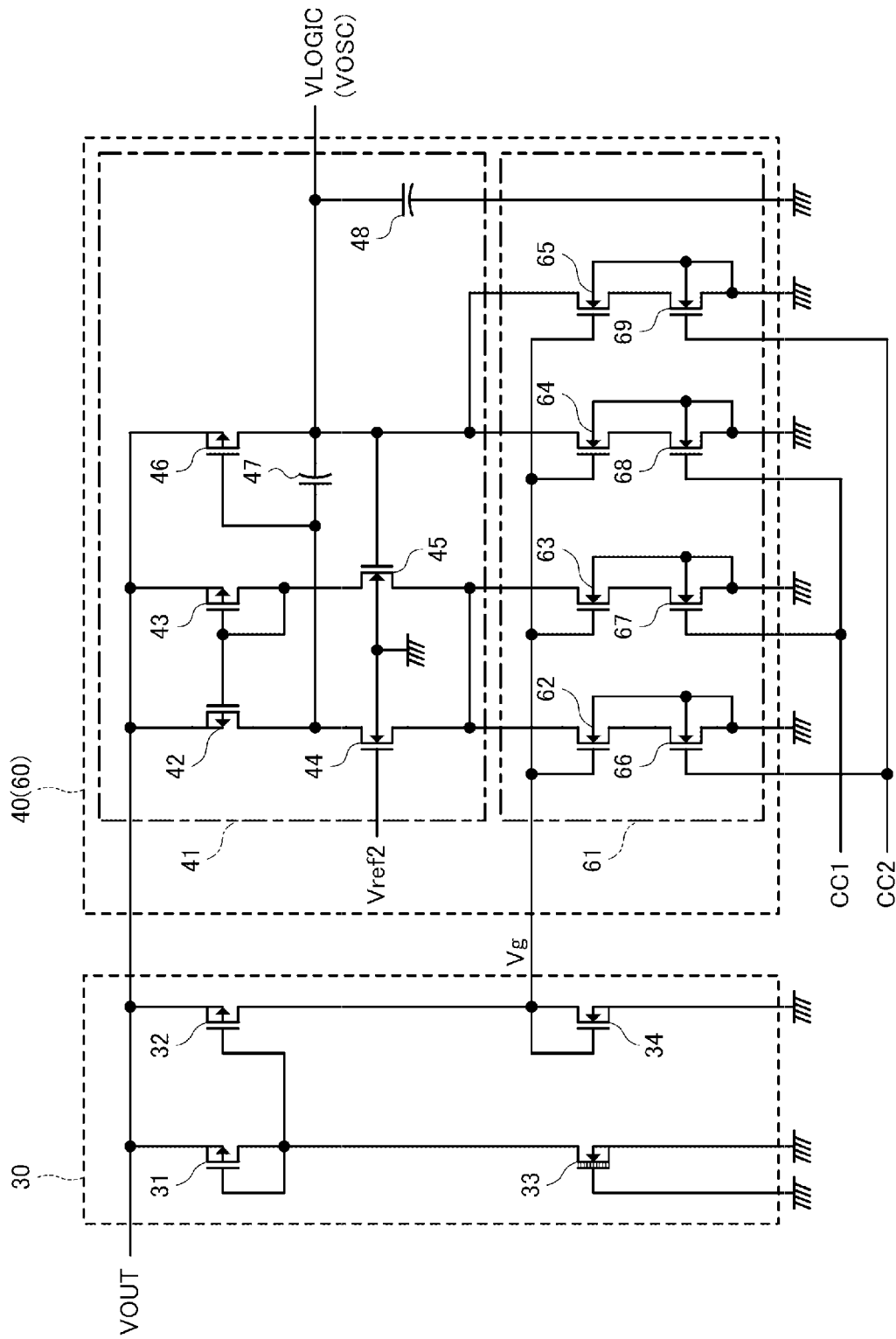
FIG. 4 is a diagram illustrating a configuration of a constant current circuit and a control voltage output circuit.

Here, an example of the configuration of the constant current circuit 30, the control voltage output circuit 40, and the oscillation voltage output circuit 60 will be described with reference to FIG. 4. FIG. 4 is a diagram illustrating the configuration of the constant current circuit 30 and the control voltage output circuit 40. The control voltage output circuit 40 and the oscillation voltage output circuit 60 have the same configuration except that the output signal is the voltage LOGIC or the voltage VOSC and the voltage value of a reference voltage Vref2 is different. Therefore, in FIG. 4, the configuration of the control voltage output circuit 40 will be described, and the description of the oscillation voltage output circuit 60 will be omitted.

The constant current circuit 30 includes transistors 31, 32, 33, and 34. In the embodiment, each of the transistors 31 and 32 is a P-channel MOS transistor, and the transistors 33 and 34 are N-channel MOS transistors. Furthermore, in the embodiment, the transistor 33 is described as a depletion type transistor. The transistors 31 and 32 will be described as transistors having the same driving ability. Here, the driving capability of a transistor is a current that flows between a drain and a source terminal in accordance with a current supplied to a gate terminal, and is determined by, for example, a shape ratio such as a W/L ratio of the transistor.

The transistors 31 and 32 constitute a current mirror circuit. Specifically, the voltage VOUT is input to the source of the transistor 31 and the source of the transistor 32. The gate and drain of the transistor 31 and the gate of the transistor 32 are coupled in common. The drain of the transistor 31 is also coupled to the drain of the transistor 33.

The gate and source of the transistor 33 are coupled to the ground. As described above, the transistor 33 is a depletion type. Therefore, between the drain and the source of the transistor 33, a current when there is no potential difference between the gate and the source, for example, a low current of about several nA flows. Therefore, a low current of about several nA similar to the current flowing between the drain and source of the transistor 33 flows between the source and drain of the transistor 31 coupled in series with the transistor 33 and between the source and drain of the transistor 32 constituting the current mirror circuit with the transistor 31. In the following description, a current flowing between the source and drain of the transistor 31 may be simply referred to as a current flowing in the transistor 31, a current flowing between the source and drain of the transistor 32 may be simply referred to as a current flowing in the transistor 32, and a current flowing between the drain and source of the transistor 33 may be simply referred to as a current flowing through the transistor 33.

The drain of the transistor 32 is coupled to the drain and gate of the transistor 34. The source of the transistor 34 is coupled to the ground. Therefore, a voltage based on the current flowing through the transistor 33 is generated at the drain and gate of the transistor 34. Then, the constant current circuit 30 outputs the voltage generated at the drain and gate of the transistor 34 as the current regulating signal Vg.

The control voltage output circuit 40 generates and outputs a voltage VLOGIC based on the voltage VOUT that is the output of the switch circuit 10. The control voltage output circuit 40 includes a differential amplifier circuit 41 and a current control circuit 61. The differential amplifier circuit 41 includes transistors 42, 43, 44, 45, and 46 and capacitors 47 and 48. In the embodiment, each of the transistors 42, 43, and 46 is described as being a P-channel MOS transistor, and each of the transistors 44 and 45 is described as being an N-channel MOS transistor. The transistor 42 and the transistor 43 will be described as transistors having the same driving ability.

In the differential amplifier circuit 41, the transistor 42 and the transistor 43 constitute a current mirror circuit. Then, the current mirror circuit, and transistors 44 and 45 constitute a differential pair circuit.

Specifically, the voltage VOUT is input to the source of the transistor 42 and the source of the transistor 43. The gate of the transistor 42 and the gate and drain of the transistor 43 are coupled in common. The drain of the transistor 42 is coupled to the drain of the transistor 44. The reference voltage Vref2 is input to the gate of the transistor 44. The drain of the transistor 43 is coupled to the drain of the transistor 45. The source of the transistor 46 is coupled to the gate of the transistor 45. The source of the transistor 44 is coupled to the source of the transistor 45. The back gate of the transistor 44 and the back gate of the transistor 45 are both coupled to the ground. The drain of the transistor 44 is coupled to the gate of the transistor 46. The voltage VOUT is input to the source of the transistor 46. The capacitor 47 is provided between the gate and drain of the transistor 46. The capacitor 48 is provided between the source of the transistor 46 and the ground.

In the differential amplifier circuit 41 configured as described above, the transistors 44 and 45 are driven based on the potential difference between the reference voltage Vref2 input to the gate of the transistor 44 and the voltage VLOGIC input to the gate of the transistor 45. The transistor 46 is driven based on the driving of the transistors 44 and 45.

Specifically, when the voltage value of the reference voltage Vref2 is larger than the voltage value of the voltage VLOGIC, the current between the drain and the source of the transistor 44 is larger than the current between the drain and the source of the transistor 45. As a result, the drain of the transistor 46 is output to the voltage VOUT side. On the other hand, when the voltage value of the reference voltage Vref2 is smaller than the voltage value of the voltage VLOGIC, the current between the drain and the source of the transistor 44 is smaller than that the current between the drain and the source of the transistor 45. As a result, the drain of the transistor 46 is output to the VSS side. In the differential pair circuit in the embodiment, the drain of the transistor 46 and the gate of the transistor 45 are coupled. Thereby, a negative feedback circuit (negative feedback) is configured. Therefore, the differential pair circuit operates so that the difference between the voltage value of the drain of the transistor 46 and the reference voltage Vref2 becomes small. As a result, a constant voltage value is output as the voltage VLOGIC. The capacitor 47 functions as a phase compensation capacitor for suppressing the VLOGIC voltage from oscillating, and the capacitor 48 functions as a potential maintaining capacitor for reducing the voltage value fluctuation of the voltage VLOGIC due to the load fluctuation of the circuit driven by the VLOGIC voltage.

The current control circuit 61 controls the current supplied to the control voltage output circuit 40. The current control circuit 61 includes transistors 62, 63, 64, 65, 66, 67, 68, and 69. In the embodiment, the transistors 62, 63, 64, 65, 66, 67, 68, and 69 are described as being N-channel MOS transistors.

The gate of the transistor 62 is coupled to the gate and drain of the transistor 34. The drain of the transistor 62 is coupled to the drain of the transistor 44 and the drain of the transistor 45. The source of the transistor 62 is coupled to the drain of the transistor 66. The back gate of the transistor 62 is coupled to the ground. The current control signal CC2 is input to the gate of the transistor 66. The source of the transistor 66 is coupled to the ground.

In the transistors 62 and 66 coupled as described above, the transistor 62 constitutes a current mirror circuit with the transistor 34 included in the constant current circuit 30. The transistor 66 switches between conduction and non-conduction between the drain and the source based on the current control signal CC2. In a case where the drain and source of the transistor 66 are controlled to be conductive by the current-control signal CC2, a current based on the driving capability of the transistor 62 and the current regulation signal Vg flows between the drain and source of the transistor 62. In addition, when the drain and source of the transistor 66 are controlled to be non-conductive by the current control signal CC2, no current flows between the drain and the source of the transistor 62. In the following description, a current flowing between the drain and source of the transistor 62 may be simply referred to as a current flowing through the transistor 62. In addition, a state where the drain and the source of the transistor 66 are conductive may be referred to as "on", and a state where the drain and the source are not conductive may be referred to as "off".

The gate of the transistor 63 is coupled to the gate and drain of the transistor 34. The drain of the transistor 63 is coupled to the drain of the transistor 44 and the drain of the transistor 45. The source of the transistor 63 is coupled to the drain of the transistor 67. The back gate of the transistor 63 is coupled to the ground. The current control signal CC1 is input to the gate of the transistor 67. The source of the transistor 67 is coupled to the ground.

In the transistors 63 and 67 coupled as described above, the transistor 63 constitutes a current mirror circuit with the transistor 34 included in the constant current circuit 30. The transistor 67 switches between conduction and non-conduction between the drain and the source based on the current control signal CC1. In a case where the drain and source of the transistor 66 are controlled to be conductive by the current-control signal CC1, a current based on the driving capability of the transistor 63 and the current regulation signal Vg flows between the drain and source of the transistor 63. In addition, when the drain and source of the transistor 67 are controlled to be non-conductive by the current control signal CC1, no current flows between the drain and the source of the transistor 63. In the following description, a current flowing between the drain and source of the transistor 63 may be simply referred to as a current flowing through the transistor 63. In addition, a state where the drain and the source of the transistor 67 are conductive may be referred to as "on", and a state where the drain and the source are not conductive may be referred to as "off".

The gate of the transistor 64 is coupled to the gate and drain of the transistor 34. The drain of the transistor 64 is coupled to the drain of the transistor 46. The source of the transistor 64 is coupled to the drain of the transistor 68. The back gate of the transistor 64 is coupled to the ground. The current control signal CC1 is input to the gate of the transistor 68. The source of the transistor 68 is coupled to the ground.

In the transistors 64 and 68 coupled as described above, the transistor 64 constitutes a current mirror circuit with the transistor 34 included in the constant current circuit 30. The transistor 68 switches between conduction and non-conduction between the drain and the source based on the current control signal CC1. In a case where the drain and source of the transistor 68 are controlled to be conductive by the current-control signal CC1, a current based on the driving capability of the transistor 64 and the current regulation signal Vg flows between the drain and source of the transistor 64. In addition, when the drain and source of the transistor 68 are controlled to be non-conductive by the current control signal CC1, no current flows between the drain and the source of the transistor 64. In the following description, a current flowing between the drain and the source of the transistor 64 may be simply referred to as a current flowing through the transistor 64. In addition, a state where the drain and the source of the transistor 68 are conductive may be referred to as "on", and a state where the drain and the source are not conductive may be referred to as "off".

The gate of the transistor 65 is coupled to the gate and drain of the transistor 34. The drain of the transistor 65 is coupled to the drain of the transistor 46. The source of the transistor 65 is coupled to the drain of the transistor 69. The back gate of the transistor 65 is coupled to the ground. The current control signal CC2 is input to the gate of the transistor 69. The source of the transistor 69 is coupled to the ground.

In the transistors 65 and 69 configured as described above, the transistor 65 constitutes a current mirror circuit with the transistor 34 included in the constant current circuit 30. The transistor 69 switches between conduction and non-conduction between the drain and the source based on the current control signal CC2. That is, when the drain and source of the transistor 69 are controlled to be conductive by the current-control signal CC2, a current based on the driving capability of the transistor 65 and the current regulation signal Vg flows between the drain and source of the transistor 65. In addition, when the drain and source of the transistor 69 are controlled to be non-conductive by the current control signal CC2, no current flows between the drain and the source of the transistor 65. In the following description, a current flowing between the drain and source of the transistor 65 may be simply referred to as a current flowing through the transistor 65. In addition, a state where the drain and the source of the transistor 69 are conductive may be referred to as "on", and a state where the drain and the source are not conductive may be referred to as "off".

As described above, the current control circuit 61 controls the current supplied to the control voltage output circuit 40 including the differential amplifier circuit 41 based on the input current control signals CC1 and CC2.

Here, in the embodiment, when it is desired to operate the control voltage output circuit 40 with low current consumption, the current control circuit 61 receives the H level current control signal CC1 and the L level current control signal CC2. That is, when the current supplied to the control voltage output circuit 40 is not increased, it is controlled so that a current flows through the transistors 63 and 64 and no current flows through the transistors 62 and 65. As a result, the control voltage output circuit 40 is supplied with a current that is the sum of the current flowing through the transistor 63 and the current flowing through the transistor 64.

In addition, when it is desired to improve the operation stability such as the response and output follow-up of the control voltage output circuit 40 by supplying a large amount of current to the control voltage output circuit 40, the current control circuit 61 receives an H level current control signal CC1 and an H level current control signal CC2. That is, when the current supplied to the control voltage output circuit 40 is increased, it is controlled so that a current flows through the transistors 62, 63, 64, and 65. As a result, the control voltage output circuit 40 is supplied with a current obtained by combining the current that flows through the transistor 62, the current that flows through the transistor 63, the current that flows through the transistor 64, and the current that flows through the transistor 65.

As described above, the transistors 62 and 65 operate so as to flow the current when it is desired to supply a large amount of current to the control voltage output circuit 40 and do not operate when it is desired to operate the control voltage output circuit 40 with low current consumption. Therefore, the driving capability of the transistors 62 and 65 may be larger than the driving capability of the transistors 63 and 64. That is, when it is desired to operate with the low current consumption of the RTC module 1, only the transistors 63 and having a smaller driving capability compared to the transistors 62 and 65 are driven, and when it is desired to supply a large amount of current to the control voltage output circuit 40, the transistors 62 and 65 having a larger driving capability are driven in addition to the transistors 63 and 64. As a result, it is possible to satisfy both the reduction of the current consumption of the RTC module 1 and the improvement of the operational stability.

Here, the transistor 63 is an example of a first transistor, and the transistor 62 is an example of a second transistor. The transistor 64 is another example of the first transistor, and the transistor 65 is another example of the second transistor. The control voltage output circuit 40 that outputs the voltage VLOGIC based on the voltage VOUT that is the output of the switch circuit 10 is an example of a constant voltage circuit, and the voltage VLOGIC is an example of a constant voltage signal. The oscillation voltage output circuit 60 having the same configuration as the control voltage output circuit 40 is another example of the constant voltage circuit, and the voltage VSOC output from the oscillation voltage output circuit 60 is another example of the constant voltage signal.

The voltage VLOGIC output from the control voltage output circuit 40 configured as described above is input to the logic circuit 100 and the power-on reset circuit 50. The voltage VOSC output from the oscillation voltage output circuit 60 is input to the oscillation circuit 70.

Returning to FIG. 1, the voltage VLOGIC is input to the power-on reset circuit 50. Then, a reset signal RS1 is output according to whether or not the voltage VLOGIC is equal to or higher than a predetermined voltage value. Specifically, the power-on reset circuit 50 outputs the reset signal RS1 that resets the operation of the logic circuit 100 when the voltage value of the voltage VLOGIC is lower than the predetermined voltage value.

The voltage VOSC is input to the oscillation circuit 70. The oscillation circuit 70 operates based on the voltage VOSC and outputs the oscillation signal OSC having a predetermined frequency such as 32.768 kHz.

Figure 5:
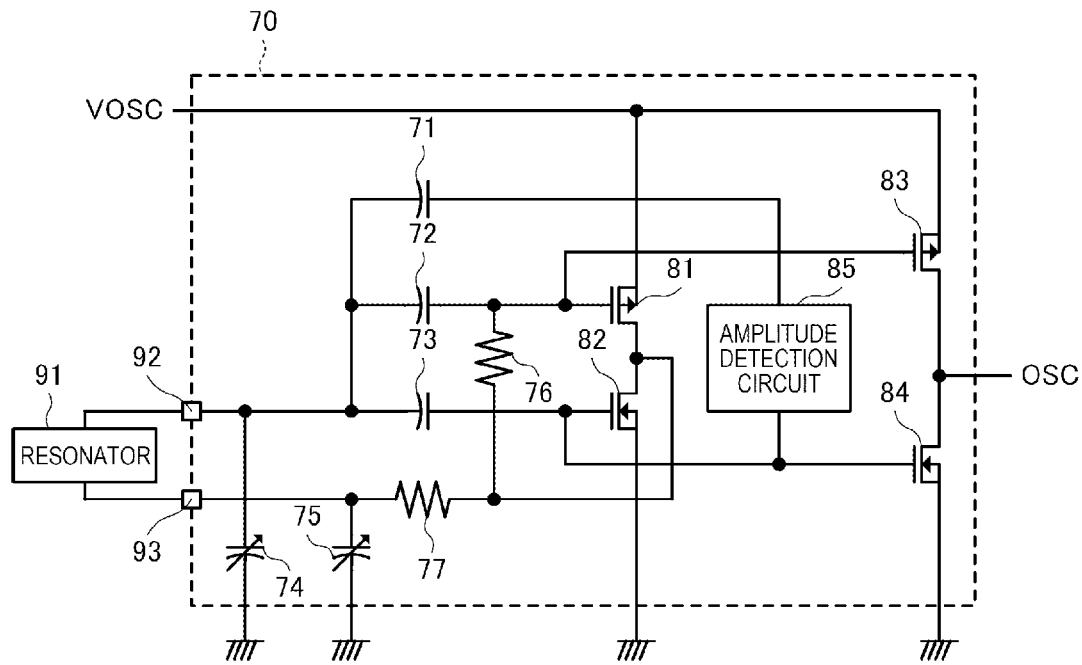
FIG. 5 is a diagram illustrating a configuration of an oscillation circuit.

FIG. 5 is a diagram illustrating the configuration of the oscillation circuit 70. The oscillation circuit 70 includes capacitors 71, 72, and 73, variable capacitors 74 and 75, resistors 76 and 77, transistors 81, 82, 83, and 84, and an amplitude detection circuit 85. The oscillation circuit 70 is coupled to a resonator 91 via electrodes 92 and 93. In the embodiment, each of the transistors 81 and 83 is described as being a P-channel MOS transistor, and each of the transistors 82 and 84 is described as being an N-channel MOS transistor. Further, the resonator 91 may be a tuning fork type quartz crystal resonator, an AT cut quartz crystal resonator, an SC cut quartz crystal resonator, or the like, or may be a piezoelectric resonator or the like. Furthermore, the resonator 91 may be a micro electro mechanical systems (MEMS) resonator made of a silicon semiconductor.

The voltage VOSC is input to the source of the transistor 81. The gate of the transistor 81 is coupled to the electrode 92 through the capacitor 72. The drain of the transistor 81 is coupled to the drain of the transistor 82. The gate of the transistor 82 is coupled to the electrode 92 through the capacitor 73. The source of the transistor 82 is coupled to the ground. The coupling point between the drain of the transistor 81 and the drain of the transistor 82 is coupled to the electrode 93 through the resistor 77.

The variable capacitor 74 is provided between the electrode 92 and the ground. The variable capacitor 75 is provided between the electrode 93 and the ground. The resistor 76 is provided between the gate and drain of the transistor 81.

The gate of the transistor 83 is coupled to the gate of the transistor 81. The voltage VOSC is input to the source of the transistor 83. The drain of the transistor 83 is coupled to the drain of the transistor 84. The gate of the transistor 84 is coupled to the gate of the transistor 82. The source of the transistor 84 is coupled to the ground. The oscillation signal OSC is output from a coupling point between the drain of the transistor 83 and the drain of the transistor 84.

In the oscillation circuit 70 configured as described above, the resonator 91 is continuously oscillated by the transistors 81 and 82, the capacitors 72 and 73, the variable capacitors 74 and 75, and the resistors 76 and 77 to generate an oscillation signal. Then, the transistors 83 and 84 correct the oscillation signal to a rectangular wave and output the corrected signal as an oscillation signal OSC.

Furthermore, the oscillation circuit 70 in the embodiment includes the amplitude detection circuit 85. One end of the amplitude detection circuit 85 is coupled to the electrode 92 via the capacitor 71. The other end of the amplitude detection circuit 85 is coupled to the gate of the transistor 82. The amplitude detection circuit 85 coupled as described above detects the amplitude level of the oscillation output signal of the resonator 91 input through the capacitor 71 and the electrode 92 and controls the amplitude level of the signal input to the gate of the transistor 82 based on the detection result.

Specifically, when the oscillation output signal of the resonator 91 input to one end is larger than a predetermined amplitude, the amplitude detection circuit 85 controls the amplitude of the signal input to the gate of the transistor 82 to be small. In addition, when the oscillation output signal of the resonator 91 input to one end is smaller than a predetermined amplitude, the amplitude detection circuit 85 controls the amplitude of the signal input to the gate of the transistor 82 to be large. As a result, the amplitude level of the oscillation output signal output from the electrode 92 can be adjusted. Therefore, a possibility that a through current is generated in the transistors 81 and 82 and the transistors 83 and 84 is reduced. As a result, the current consumption of the RTC module 1 can be further reduced.

Returning to FIG. 1, the level shifter 80 receives the oscillation signal OSC and the voltage VLOGIC. Then, the level shifter 80 shifts the voltage value of the oscillation signal OSC to a voltage value based on the voltage VLOGIC and outputs the voltage value to the logic circuit 100.

The logic circuit 100 receives the voltage VLOGIC, the oscillation signal OSC level-shifted to a voltage value based on the voltage VLOGIC, the reset signal RS1, and the voltage detection signal VDET. The logic circuit 100 includes a switch control circuit 101, a threshold switching control circuit 102, and a current control circuit 103. Various configurations of the logic circuit 100 including the switch control circuit 101, the threshold switching control circuit 102, and the current control circuit 103 operate by using the voltage VLOGIC as a power supply voltage.

The switch control circuit 101 generates power supply switching control signals CS1, CS2, and CS3 based on the input voltage detection signal VDET and controls the transistors 11, 12, and 13 included in the switch circuit 10 described above. That is, the switch control circuit 101 controls the switching of the switch circuit 10 by controlling the switching of the transistors 11, 12, and 13 included in the switch circuit 10 based on the voltage detection signal VDET output from the power supply detection circuit 20. Thereby, the switch circuit 10 switches between outputting the voltage VDD output to the terminal Vout as the voltage VOUT and outputting the voltage VBAT output to the terminal Vout as the voltage VOUT.

Specifically, when the voltage detection signal VDET output from the power supply detection circuit 20 is an H level signal indicating that the voltage value of the voltage VDD is higher than a predetermined threshold voltage VR1, the switch control circuit 101 outputs the power supply switching control signals CS1, CS2, and CS3 as L, H, and H levels, respectively, in order to output the voltage VDD as the voltage VOUT. In a case where the voltage detection signal VDET output from the power supply detection circuit 20 is an L level signal indicating that the voltage value of the voltage VDD is lower than a predetermined threshold voltage VR2, the switch control circuit 101 outputs the power supply switching control signals CS1, CS2, and CS3 as H, L, and L levels, respectively, in order to output the voltage VBAT as the voltage VOUT.

The threshold switching control circuit 102 generates a threshold control signal CT based on the voltage detection signal VDET and outputs the threshold control signal CT to the power supply detection circuit 20 described above, thereby controlling the switch 25 included in the power supply detection circuit 20. As a result, the power supply detection circuit 20 can detect by using different detection thresholds when the voltage VDD is increasing and when the voltage VDD is decreasing. That is, the threshold switching control circuit 102 controls the switching of the detection threshold of the voltage VDD in the power supply detection circuit 20.

Specifically, when the voltage detection signal VDET output from the power supply detection circuit 20 is at H level, the threshold switching control circuit 102 outputs an L level threshold control signal CT, and when the voltage detection signal VDET output from the power supply detection circuit 20 is at L level, the threshold switching control circuit 102 outputs an H level threshold control signal CT.

The current control circuit 103 outputs the current control signals CC1 and CC2 corresponding to the voltage detection signal VDET to the control voltage output circuit and the oscillation voltage output circuit 60. The transistors 66, 67, 68, and 69 included in the control voltage output circuit 40 and the oscillation voltage output circuit 60 are controlled based on the current control signals CC1 and CC2. As a result, the current supplied to each of the control voltage output circuit 40 and the oscillation voltage output circuit 60 is controlled. That is, the current control circuit 103 controls the current supplied to each of the control voltage output circuit 40 and the oscillation voltage output circuit 60. The relationship between the current control signals CC1 and CC2 output from the current control circuit 103 and the voltage detection signal VDET will be described later.

Further, the reset signal RS1 is input to the logic circuit 100 from the power-on reset circuit 50 described above. In other words, the power-on reset circuit 50 outputs the reset signal RS1 to the switch control circuit 101, the threshold switching control circuit 102, and the current control circuit 103 included in the logic circuit 100.

In a case where the logic level of the input reset signal RS1 is switched from L level to H level, the logic circuit 100 operates by using the voltage VLOGIC input from the control voltage output circuit 40 as a power supply voltage. On the other hand, when the logic level of the input reset signal RS1 is switched from H level to L level, the logic circuit 100 causes the logic circuit 100 to execute reset processing on the assumption that the voltage value of the voltage VLOGIC input from the control voltage output circuit 40 is not sufficient. Here, the reset signal RS1 is an example of a first reset signal, and the power-on reset circuit 50 is an example of a first power-on reset circuit.

Further, the oscillation signal OSC level-shifted to the voltage value of the voltage VLOGIC by the level shifter 80 is input to the logic circuit 100. Then, the logic circuit 100 outputs the oscillation signal OSC level-shifted to the voltage value of the input voltage VLOGIC as the oscillation signal CLK. The logic circuit 100 may include an oscillation signal output control circuit (not illustrated) that switches whether or not to output the oscillation signal OSC level-shifted to the voltage value of the voltage VLOGIC as the oscillation signal CLK.

The level shifter 210 receives the oscillation signal CLK and the voltage VLOGIC. Then, the level shifter 210 level-shifts the voltage value of the oscillation signal CLK to a voltage value based on a voltage VIO according to the specification of the RTC module 1.

The output circuit 220 receives a signal obtained by level shifting the oscillation signal CLK to a voltage value based on the voltage VIO. Then, the output circuit 220 performs waveform correction or the like on the signal obtained by level-shifting the input oscillation signal CLK to a voltage value based on the voltage VIO and outputs the signal from the terminal Fout as an output signal FOUT.

The timing circuit 230 receives the oscillation signal CLK. The timing circuit 230 includes a frequency dividing circuit (not illustrated). Then, the frequency dividing circuit divides the oscillation signal CLK to generate a signal having a desired frequency. The timing circuit 230 performs a clock operation based on the divided oscillation signal CLK. The timing circuit 230 generates, for example, timing data representing time in seconds, timing data representing time in years, and the like as the clock operation.

The interface circuit 240 is an interface for performing communication between the RTC module 1 and an external device (not illustrated), and receives various commands from the external device and reads timing data according to the received command. The interface circuit 240 may be an interface circuit compatible with various serial buses such as an interface circuit compatible with an inter-integrated circuit (I2C) bus and an interface circuit compatible with a serial peripheral interface (SPI) bus and may also be an interface circuit compatible with a parallel bus. Then, the signal converted into a desired propagation format by the interface circuit is output from the terminal I/F_io as the output signal I/F_IO.

Here, in the RTC module that switches between supplying the main power supply as the power supply voltage and supplying the backup power supply as the power supply voltage, there is a possibility that a temporary voltage value change occurs in a constant voltage signal generated inside the RTC module when the main power supply is switched to the backup power supply or when the backup power supply is switched to the main power supply.

In a case where a change occurs in the voltage value of the constant voltage signal supplied to the oscillation circuit among the constant voltage signals generated inside the RTC module, there is a possibility that the operation of the oscillation circuit is temporarily stopped, and accordingly, the timing accuracy of the timing function that operates based on the output of the oscillation circuit may decrease. In addition, when a change occurs in the voltage value of the constant voltage signal supplied to the logic circuit among the constant voltage signals generated inside the RTC module, there is a possibility that the power-on reset circuit coupled to the logic circuit operates and initializes the logic circuit.

The above problems are caused by the fact that since the RTC module is operated with low current consumption in order to suppress the consumption of the backup power supply, the responsiveness of the constant voltage generation circuit that generates a constant voltage signal is low, and the constant voltage signal generation operation of the constant voltage generation circuit cannot follow up the change in the voltage value of the supply voltage that occurs when the power supply destination is switched.

Therefore, the RTC module 1 according to the embodiment includes the control voltage output circuit 40 that outputs the voltage VLOGIC, which is a constant voltage signal, based on the voltage VOUT, and the current control circuit 103 that controls a current supplied to each oscillation voltage output circuit 60 that outputs the voltage VOSC, which is a constant voltage signal, based on the voltage VOUT, and when the switch control circuit 101 switches the voltage VOUT supplied to the RTC module 1 through the switch circuit 10 from the voltage VDD to the voltage VBAT or from the VBAT to the voltage VDD, the current control circuit 103 performs control to increase the current supplied to at least one of the control voltage output circuit 40 and the oscillation voltage output circuit 60. Accordingly, the follow-up of the constant voltage signal generation operation of the control voltage output circuit 40 and the oscillation voltage output circuit 60 in response to the fluctuation of the voltage value of the voltage VOUT is improved. Therefore, the possibility of temporary voltage value changes occurring in the voltages VLOGIC and VOSC generated inside the RTC module 1 is reduced.

1.1.2 Switching Control of Power Supply Voltage

As described above, in the RTC module 1 in the embodiment, when voltage switching control for switching between supplying the voltage VBAT as the voltage VOUT and supplying the voltage VDD in the switch control circuit 101 is executed, the possibility of temporary voltage value changes occurring in the voltages VLOGIC and VOSC generated in the RTC module 1 is reduced by executing current increase control for increasing the current supplied to the control voltage output circuit 40 and the oscillation voltage output circuit 60 in the current control circuit 103.

The relationship between the voltage switching control in the switch control circuit 101 and the current increase control in the current control circuit 103 in the RTC module 1 according to the embodiment will be described with reference to FIGS. 6 and 7.

Figure 6:
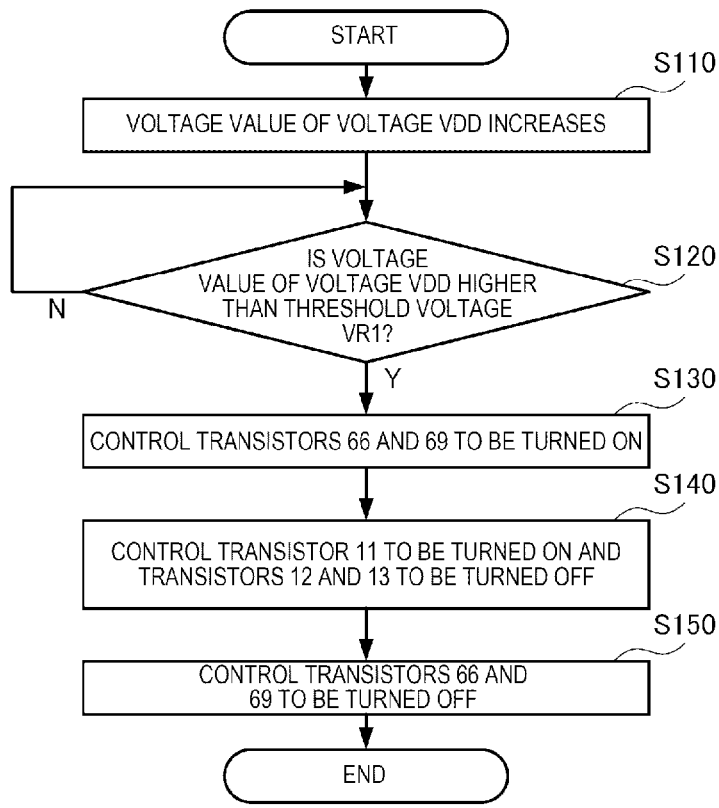
FIG. 6 is a flowchart illustrating an operation of the real-time clock module when a voltage value of a voltage VDD rises from a state where the voltage value of the voltage VDD is lower than a threshold voltage VR2.

FIG. 6 is a flowchart illustrating the operation of the RTC module 1 when the voltage value of the voltage VDD rises from the state where the voltage value of the voltage VDD is lower than the threshold voltage VR2. Here, the state where the voltage value of the voltage VDD is lower than the threshold voltage VR2 includes a state where the voltage VDD is not supplied to the RTC module 1.

In a state where the voltage value of the voltage VDD is lower than the threshold voltage VR2, if the commercial power supply for generating the voltage VDD is turned on again, the primary battery is replaced, the secondary battery is recharged, the voltage value of the voltage VDD increases (step S110). Then, the power supply detection circuit 20 determines whether or not the voltage value of the voltage VDD is higher the threshold voltage VR1 (step S120).

In a case where the voltage value of the voltage VDD is equal to or lower than the threshold voltage VR1 (N in step S120), the power supply detection circuit 20 continues to determine whether or not the voltage value of the voltage VDD is higher the threshold voltage VR1 (step S120). On the other hand, when the power supply detection circuit 20 determines that the voltage value of the voltage VDD is higher than the threshold voltage VR1 (Y in step S120), the current control circuit 103 controls the transistors 66 and 69 to be turned on (step S130). Specifically, the current control circuit 103 outputs the H level current control signal CC2 when the voltage detection signal VDET is inverted from L level to H level. Thereby, the transistors 66 and 69 are controlled to be turned on. Then, when the transistors 66 and 69 are controlled to be turned on, a current flows through each of the transistors 62 and 65. Although the description is omitted, in the flowchart of FIG. 6, the current control signal CC1 is kept at the H level.

After the current control circuit 103 sets the current control signal CC2 to the H level, the switch control circuit 101 controls the transistor 11 to be turned on and the transistors 12 and 13 to be turned off (step S140).

Specifically, the switch control circuit 101 sets the power supply switching control signals CS1, CS2, and CS3 to L, H, and H levels. Thereby, the switch circuit 10 outputs the voltage VDD as the voltage VOUT.

Then, after the voltage VDD is output as the voltage VOUT, the current control circuit 103 controls the transistors 66 and 69 to be turned off (step S150). Specifically, the current control circuit 103 sets the current control signal CC2 to L level. Thereby, the transistors 66 and 69 are controlled to be turned off. Then, when the transistors 66 and 69 are controlled to be turned off, the currents flowing through the transistors 62 and 65 are cut off.

Figure 7:
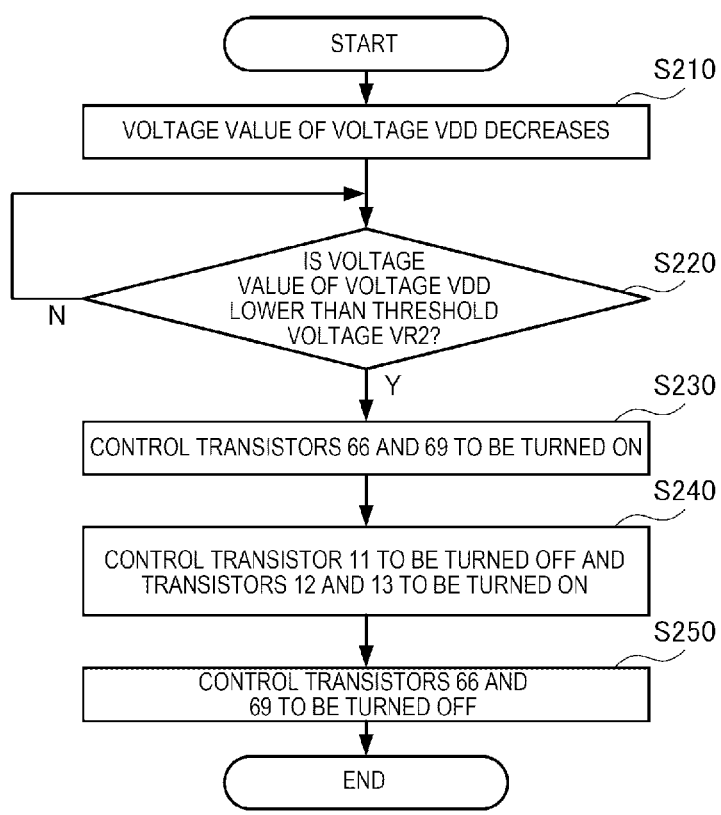
FIG. 7 is a flowchart illustrating the operation of the real-time clock module when the voltage value of the voltage VDD decreases from a state where the voltage value of the voltage VDD is higher than a threshold voltage VR1.

FIG. 7 is a flowchart illustrating the operation of the RTC module 1 when the voltage value of the voltage VDD decreases from the state where the voltage value of the voltage VDD is higher than the threshold voltage VR1.

In a state where the voltage value of the voltage VDD is higher than the threshold voltage VR1, the voltage value of the voltage VDD decreases due to the stop of the commercial power supply for generating the voltage VDD, the shortage of the remaining battery power of the primary battery and the secondary battery (step S210). Then, the power supply detection circuit 20 determines whether or not the voltage value of the voltage VDD is lower than the threshold voltage VR2 (step S220).

In a case where the voltage value of the voltage VDD is equal to or higher than the threshold voltage VR2 (N in step S220), the power supply detection circuit 20 continues to determine whether or not the voltage value of the voltage VDD is lower than the threshold voltage VR2 (step S220). On the other hand, when the power supply detection circuit 20 determines that the voltage value of the voltage VDD is lower than the threshold voltage VR2 (Y in step S220), the current control circuit 103 controls the transistors 66 and 69 to be turned on (step S230). Specifically, the current control circuit 103 outputs the H level current control signal CC2 when the voltage detection signal VDET is inverted from the H level to the L level. As a result, the transistors 66 and 69 are controlled to be turned on. Then, when the transistors 66 and 69 are controlled to be turned on, a current flows through each of the transistors 62 and 65. Although description is omitted, in the flowchart of FIG. 7, the current control signal CC1 is kept at the H level.

After the current control circuit 103 outputs the H level current control signal CC2, the switch control circuit 101 controls the transistor 11 to be turned off and the transistors 12 and 13 to be turned on (step S240). Specifically, the switch control circuit 101 sets the logic levels of the power supply switching control signals CS1, CS2, and CS3 to the H, L, and L levels. Thereby, the switch circuit 10 outputs the voltage VBAT as the voltage VOUT.

Then, after the voltage VDD is output as the voltage VOUT, the current control circuit 103 controls the transistors 66 and 69 to be turned off (step S250). Specifically, the current control circuit 103 sets the current control signal CC2 to L level. Thereby, the transistors 66 and 69 are controlled to be turned off. Then, when the transistors 66 and 69 are controlled to be turned off, the currents flowing through the transistors 62 and 65 are cut off.

As described above, when the switch control circuit 101 switches the switch circuit 10 based on the voltage detection signal VDET, in the RTC module 1 according to the embodiment, the current control circuit 103 increases the current supplied to the control voltage output circuit 40 and the oscillation voltage output circuit 60. Thereby, even when the voltage value of the voltage VOUT changes, the follow-up of the operation for generating the voltage VLOGIC in the control voltage output circuit 40 and the operation for generating the voltage VOSC in the oscillation voltage output circuit 60 is enhanced. Therefore, when the voltage supplied to the RTC module 1 is switched from the voltage VDD to the voltage VBAT or from the voltage VBAT to the voltage VDD, the possibility that the voltage VLOGIC and the voltage VOSC having constant voltage values change is reduced in response to a change in the voltage value of the voltage VOUT.

In this case, as illustrated in the embodiment, the switch control circuit 101 may switch the switch circuit 10 after the current control circuit 103 increases the current supplied to the control voltage output circuit 40 and the oscillation voltage output circuit 60. That is, when the voltage VOUT is switched from the voltage VDD to the voltage VBAT or from the voltage VBAT to the voltage VDD, the current supplied to the control voltage output circuit 40 and the oscillation voltage output circuit 60 may be increased. Thereby, when the voltage supplied to the RTC module 1 is switched from the voltage VDD to the voltage VBAT or from the voltage VBAT to the voltage VDD, it is possible to further reduce the possibility that the voltage VLOGIC and the voltage VOSC change, in response to a change in the voltage value of the voltage VOUT.

Here, a specific example of the voltage switching control and the current increase control when the supply of the voltage VDD to the RTC module 1 according to the embodiment is started will be described with reference to FIGS. 8 and 9.

Figure 8:
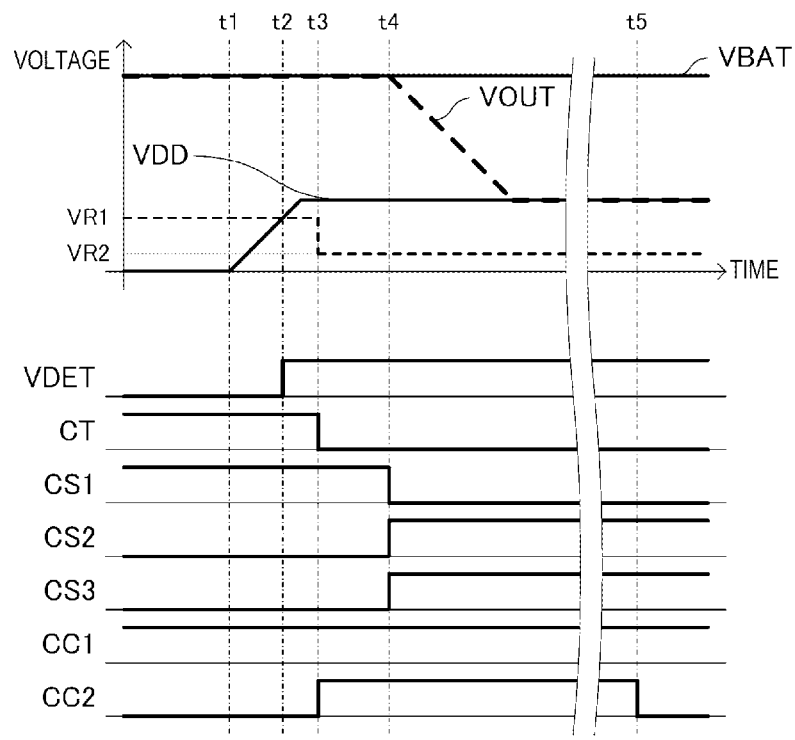
FIG. 8 is a timing chart illustrating an operation when the voltage VDD supplied to the real-time clock module is lower than a voltage VBAT and higher than the threshold voltage VR1.

FIG. 8 is a timing chart illustrating an operation when the voltage VDD supplied to the RTC module 1 is lower than a voltage VBAT and higher than the threshold voltage VR1.

First, before time t1, the voltage VDD is not supplied to the RTC module 1. For this reason, the voltage VBAT is supplied as the voltage VOUT. In other words, the power supply switching control signals CS1, CS2, and CS3 are controlled to H, L, and L levels. Since the voltage VDD is not supplied, the power supply detection circuit 20 outputs the L level voltage detection signal VDET, and accordingly, the threshold switching control circuit 102 outputs the H level threshold control signal CT. The control voltage output circuit 40 and the oscillation voltage output circuit 60 are supplied with an H level current control signal CC1 and an L level current control signal CC2. That is, the control voltage output circuit 40 and the oscillation voltage output circuit 60 operate with low current consumption.

At time t1, when the voltage VDD is supplied to the RTC module 1, the voltage value of the voltage VDD increases. At time t2, when the voltage value of the voltage VDD is higher than the threshold voltage VR1, the power supply detection circuit 20 changes the voltage detection signal VDET from L level to H level. Then, at time t3 after a predetermined time has elapsed after the voltage detection signal VDET becomes H level, the threshold switching control circuit 102 sets the threshold control signal CT to L level, and the current control circuit 103 sets the current control signal CC2 to H level. As a result, the current supplied to the control voltage output circuit 40 and the oscillation voltage output circuit 60 increases. Then, at time t4 after a predetermined time has elapsed after the current control signal CC2 becomes H level, the switch control circuit 101 sets the power supply switching control signals CS1, CS2, and CS3 to L, H, and H levels. As a result, the voltage VDD is supplied as the voltage VOUT.

At time t4, the voltage shared as the voltage VOUT is switched from the voltage VBAT to the voltage VDD, whereby the voltage value of the voltage VOUT decreases. At this time, since the current control signal CC2 is at the H level, the control voltage output circuit 40 and the oscillation voltage output circuit 60 can generate voltages VLOGIC and VOSC having constant voltages even when the voltage value of the voltage VOUT is decreasing. That is, the possibility that the voltage value of the voltage VLOGIC output from the control voltage output circuit 40 and the voltage VOSC output from the oscillation voltage output circuit 60 decreases as the voltage VOUT decreases is reduced.

Then, at time t5 after the elapse of a predetermined period after time t4, the current control circuit 103 sets the current control signal CC2 to L level. As a result, the current consumption of the RTC module 1 can be reduced during a period when switching control of the power supply voltage is not executed.

Here, the current control circuit 103 may set the current control signal CC2 to the H level immediately after the voltage detection signal VDET is inverted from L level to H level, and may also set the current control signal CC2 to the H level after a predetermined period has elapsed after the voltage detection signal VDET is inverted from L level to H level. In addition, the current control circuit 103 may change the current control signal CC2 from H level to L level after a predetermined time elapses after the voltage detection signal VDET is inverted from L level to H level, or after a lapse of a predetermined period after the power supply switching control signals CS1, CS2, CS3 are switched to L, H, H level.

Figure 9:
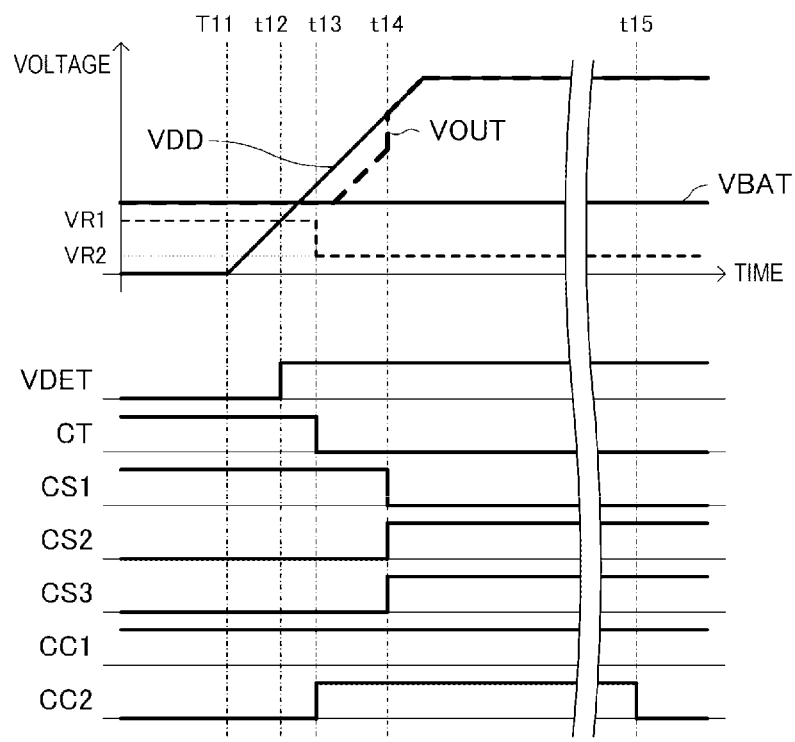
FIG. 9 is a timing chart illustrating an operation when the voltage VDD supplied to the real-time clock module is higher than the voltage VBAT and higher than the threshold voltage VR1.

FIG. 9 is a timing chart illustrating an operation when the voltage VDD supplied to the RTC module 1 is higher than the voltage VBAT and higher than the threshold voltage VR1.

First, before time t11, the voltage VDD is not supplied to the RTC module 1. For this reason, the voltage VBAT is supplied as the voltage VOUT. In other words, the power supply switching control signals CS1, CS2, and CS3 are controlled to H, L, and L levels. Since the voltage VDD is not supplied, the power supply detection circuit 20 outputs the L level voltage detection signal VDET, and accordingly, the threshold switching control circuit 102 outputs the H level threshold control signal CT. The control voltage output circuit 40 and the oscillation voltage output circuit 60 are supplied with an H level current control signal CC1 and an L level current control signal CC2. Therefore, the control voltage output circuit 40 and the oscillation voltage output circuit 60 operate with low current consumption.

At time t11, the voltage VDD is supplied to the RTC module 1, whereby the voltage value of the voltage VDD increases. At time t12, when the voltage value of the voltage VDD is higher than the threshold voltage VR1, the power supply detection circuit 20 changes the voltage detection signal VDET from L level to H level. Then, at time t13 after a predetermined time has elapsed after the voltage detection signal VDET becomes H level, the threshold switching control circuit 102 sets the threshold control signal CT to L level, and the current control circuit 103 sets the current control signal CC2 to H level. As a result, the current supplied to the control voltage output circuit 40 and the oscillation voltage output circuit 60 increases. Then, at time t14 after a predetermined time has elapsed after the current control signal CC2 becomes H level, the switch control circuit 101 sets the power supply switching control signals CS1, CS2, and CS3 to L, H, and H levels. As a result, the voltage VDD is supplied as the voltage VOUT.

Here, when the voltage value of the voltage VDD is higher than the voltage value of the voltage VBAT as illustrated in FIG. 9, the voltage value of the voltage VOUT is the voltage value of the voltage VDD supplied via the diode formed in the transistor 11. In other words, the voltage VOUT may be limited to the voltage value of the voltage VDD without depending on the power supply switching control signals CS1, CS2, and CS3. Even in such a case, the current control signal CC2 is controlled to be at H level based on the voltage value of the voltage VDD, and the current supplied to the control voltage output circuit 40 and the oscillation voltage output circuit 60 is increased, whereby the control voltage output circuit 40 and the oscillation voltage output circuit 60 can generate the voltages VLOGIC and VOSC having constant voltage values regardless of the change in the voltage value of the voltage VOUT.

The logic levels of various signals in the embodiment are examples and are not limited thereto.

1.1.3 Effects

As described above, in the RTC module 1 according to the embodiment including the control voltage output circuit 40 that outputs the voltage VLOGIC, which is a constant voltage signal, based on the voltage VOUT, and the current control circuit 103 that controls a current supplied to each oscillation voltage output circuit 60 that outputs the voltage VOSC, which is a constant voltage signal, based on the voltage VOUT, when the switch control circuit 101 switches the voltage VOUT supplied to the RTC module 1 through the switch circuit 10 from the voltage VDD to the voltage VBAT or from the VBAT to the voltage VDD, the current control circuit 103 performs control to increase the current supplied to at least one of the control voltage output circuit 40 and the oscillation voltage output circuit 60. Thereby, the follow-up of the constant voltage signal generation operation of the control voltage output circuit 40 and the oscillation voltage output circuit 60 in response to the fluctuation of the voltage value of the voltage VOUT is improved, and the possibility of temporary voltage value changes occurring in the voltages VLOGIC and VOSC generated inside the RTC module 1 is reduced.

1.2 Second Embodiment

Next, the RTC module 1 according to a second embodiment is described. In describing the RTC module 1 in the second embodiment, the same components as those in the RTC module 1 in the first embodiment are denoted by the same reference numerals, and illustration and description thereof are omitted or simplified.

Figure 10:
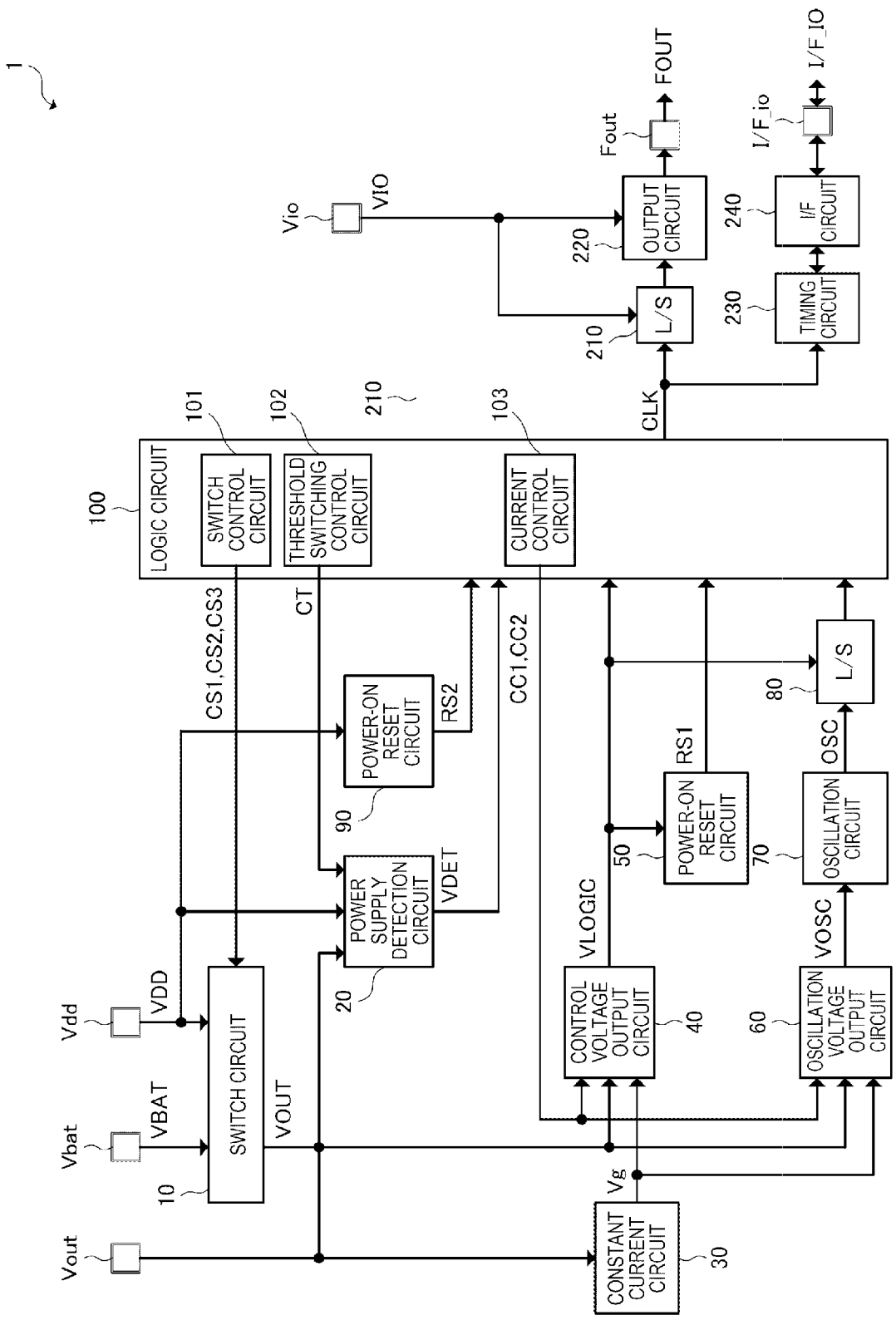
FIG. 10 is a diagram illustrating a configuration of a real-time clock module according to a second embodiment.

FIG. 10 is a diagram illustrating a configuration of the RTC module 1 of the second embodiment. The RTC module 1 in the second embodiment is a part of the logic circuit 100 when operating with VBAT which is a backup power supply, and is different from the RTC module 1 of the first embodiment in that the threshold switching control circuit 102 performs a so-called intermittent operation in which a pause period and an operation period are repeated. In addition, the RTC module 1 in the second embodiment is different from the RTC module 1 in the first embodiment in that the RTC module 1 includes a power-on reset circuit 90 that detects a voltage value of the voltage VDD and outputs a reset signal RS2 based on the detection result.

In the RTC module 1 of the second embodiment that performs such an intermittent operation, it is possible to reduce the consumption of the backup power supply. However, when the RTC module 1 performs an intermittent operation, the power supply detection circuit 20 pauses the detection of the voltage value of the voltage VDD during the pause period. Therefore, when the voltage value of the voltage VDD increases during the pause period, the power supply detection circuit cannot detect the voltage value of the voltage VDD.

Therefore, when the voltage value of the voltage VDD increases during the pause period and is higher than the voltage value of the voltage VBAT, the voltage VDD is supplied as the voltage VOUT through a diode formed in the transistor 11. As a result, the voltage value of the voltage VOUT changes.

Since the RTC module 1 in the second embodiment includes the power-on reset circuit 90 that outputs the reset signal RS2 according to the voltage value of the voltage VDD in response to such a change in voltage value of the voltage VOUT that cannot be detected by the power supply detection circuit 20, it is possible to reduce the possibility that the voltage VLOGIC output from the control voltage output circuit 40 and the voltage VOSC output from the oscillation voltage output circuit 60 change.

Figure 11:
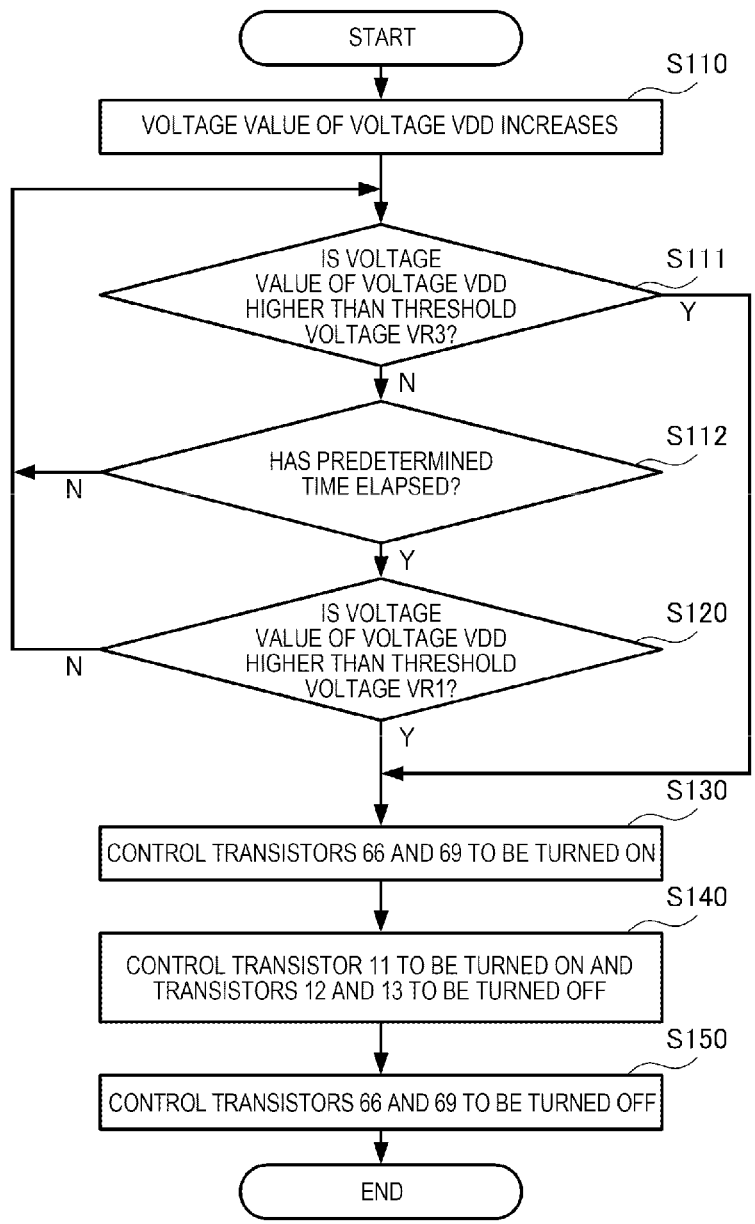
FIG. 11 is a flowchart illustrating an operation of the real-time clock module when a voltage value of a voltage VDD rises from a state where the voltage value of the voltage VDD is lower than a threshold voltage VR2 in the real-time clock module of the second embodiment.

As illustrated in FIG. 11, the power-on reset circuit 90 receives the voltage VDD at one end. In a case where the voltage VDD reaches a predetermined voltage value, an H level reset signal RS2 is output to the logic circuit 100. The logic circuit 100 outputs an H level current control signal CC2 from the current control circuit 103 when the input reset signal RS2 changes from L level to H level.

Thus, even when the RTC module 1 operates intermittently when operating with the voltage VBAT, and the voltage value of the voltage VDD increases during the pause period of the intermittent operation, it is possible to increase the current supplied to the control voltage output circuit 40 and the current supplied to the oscillation voltage output circuit 60. Therefore, in the RTC module 1 that operates intermittently, even when the voltage value of the voltage VOUT changes due to an increase in the voltage value of the voltage VDD, it is possible to reduce the possibility that the voltage values of the voltage VLOGIC and the voltage VOSC change.

FIG. 11 is a flowchart illustrating the operation of the RTC module 1 when the voltage value of the voltage VDD rises from the state where the voltage value of the voltage VDD is lower than the threshold voltage VR2 in the RTC module 1 of the second embodiment.

Similar to the first embodiment, in a state where the voltage value of the voltage VDD is lower than the threshold voltage VR2, if the commercial power supply for generating the voltage VDD is turned on again, the primary battery is replaced, the secondary battery is recharged, the voltage value of the voltage VDD increases (step S110).

Then, the power-on reset circuit 90 determines whether or not the voltage value of the voltage VDD is higher than a threshold voltage VR3 (step S111). In a case where the power-on reset circuit 90 determines that the voltage value of the voltage VDD is equal to or lower than the threshold voltage VR3 (N in step S111), the logic circuit 100 determines whether or not a predetermined time has elapsed during the pause period of the intermittent operation (step S112).

In a case where the logic circuit 100 determines that the predetermined time has not elapsed during the pause period of the RTC module 1 (N in step S112), the power-on reset circuit 90 continues to determine whether or not the voltage value of the voltage VDD is higher than the threshold voltage VR3 (step S111). That is, the RTC module 1 continues the pause period in the intermittent operation.

Further, when the logic circuit 100 determines that the predetermined time has elapsed during the pause period of the RTC module 1 (Y in step S112), the power supply detection circuit 20 determines whether or not the voltage value of the voltage VDD is higher than the threshold voltage VR1 (step S120). That is, the RTC module 1 shifts to an operation period in the intermittent operation. The operation of the RTC module after shifting to the operation period is the same as that of the first embodiment, and a description thereof will be omitted.

In a case where the power-on reset circuit 90 determines that the voltage value of the voltage VDD is higher than the threshold voltage VR3 (Y in step S111), the power-on reset circuit 90 outputs an H level reset signal RS2. Then, when the reset signal RS2 input to the logic circuit 100 is changed from L level to H level, the current control circuit 103 controls the transistors 66 and 69 to be turned on (step S130). Thereafter, the RTC module 1 performs the same operation as steps S140 and S150 of the first embodiment.

Figure 12:
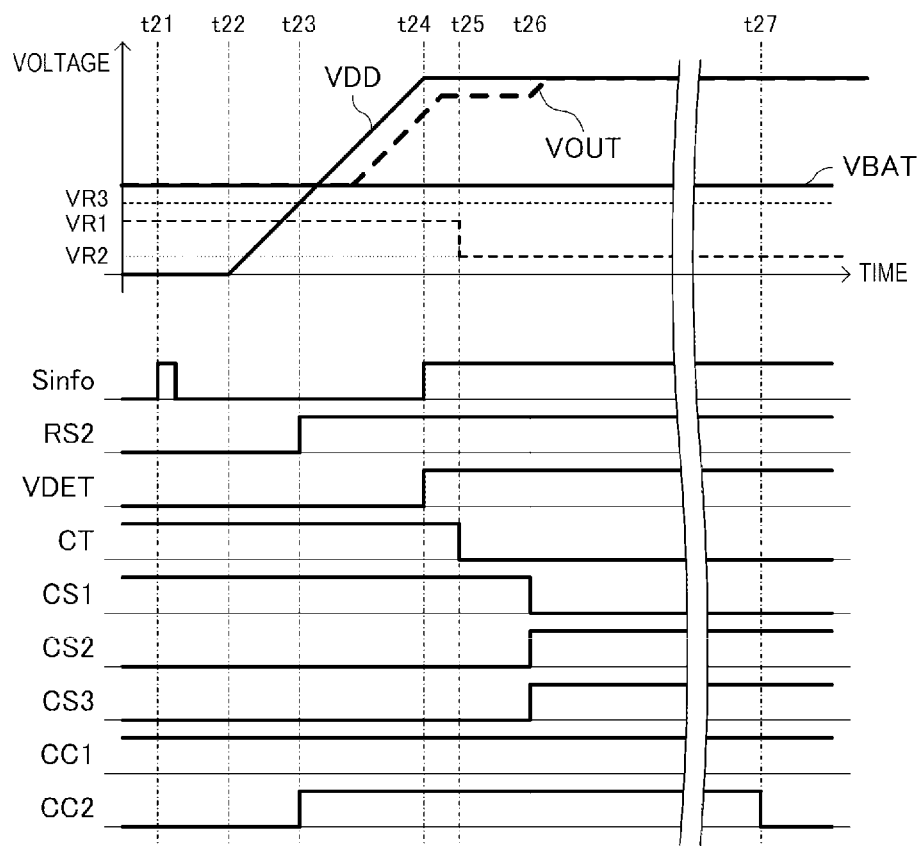
FIG. 12 is a timing chart illustrating an operation of the real-time clock module in the second embodiment.

FIG. 12 is a timing chart illustrating the operation of the RTC module 1 in the second embodiment. In FIG. 12, state information Sinfo for describing the intermittent operation of the RTC module 1 is illustrated. In FIG. 12, when the RTC module 1 is in the operation period, when the state information Sinfo is at H level and the RTC module 1 is in the pause period, the state information Sinfo is illustrated at L level.

At time t21, the RTC module 1 enters an operation period. In this case, the voltage VDD is equal to or lower than the threshold voltage VR1.

Then, at time t22 in the pause period of the RTC module 1, the voltage value of the voltage VDD increases, and then the voltage value of the voltage VDD is higher than the threshold voltage VR1. At this time, since the RTC module 1 is in the pause period, the power supply detection circuit 20 does not change the logic level of the voltage detection signal VDET.

At time t23, the voltage value of the voltage VDD is higher than the threshold voltage VR3. Accordingly, the power-on reset circuit 90 outputs an H level reset signal RS2 to the logic circuit 100. When the reset signal RS2 input to the logic circuit 100 changes from the L level to the H level, the current control circuit 103 sets the current control signal CC2 to H level. As a result, the current supplied to the control voltage output circuit 40 and the oscillation voltage output circuit 60 increases.

At time t24, the RTC module 1 enters an operation period. At this time, since the voltage value of the voltage VDD is higher than the threshold voltage VR1, the power supply detection circuit 20 sets the voltage detection signal VDET to H level. Thereafter, the RTC module 1 performs the same operations as at times t13, t14, and t15 of the first embodiment at times t25, t26, and t27, respectively.

As described above, in the RTC module 1 according to the second embodiment, the power-on reset circuit 90 detects the voltage value of the voltage VDD and outputs the reset signal RS2 based on the detection result. Then, when the reset signal RS2 input to the logic circuit 100 changes from L level to H level, the current control circuit 103 outputs the current control signal CC2 as H level. As a result, when operating with the voltage VBAT as the backup power supply, in the RTC module 1 that operates intermittently, even when the voltage value of the voltage VOUT changes, it is possible to reduce the possibility that the voltage VLOGIC output from the control voltage output circuit 40 and the voltage VOSC output from the oscillation voltage output circuit 60 change.

Here, the power-on reset circuit 90 is an example of a second power-on reset circuit, and the reset signal RS2 output from the power-on reset circuit 90 is an example of a second reset signal.

2. Electronic Device

Figure 13:
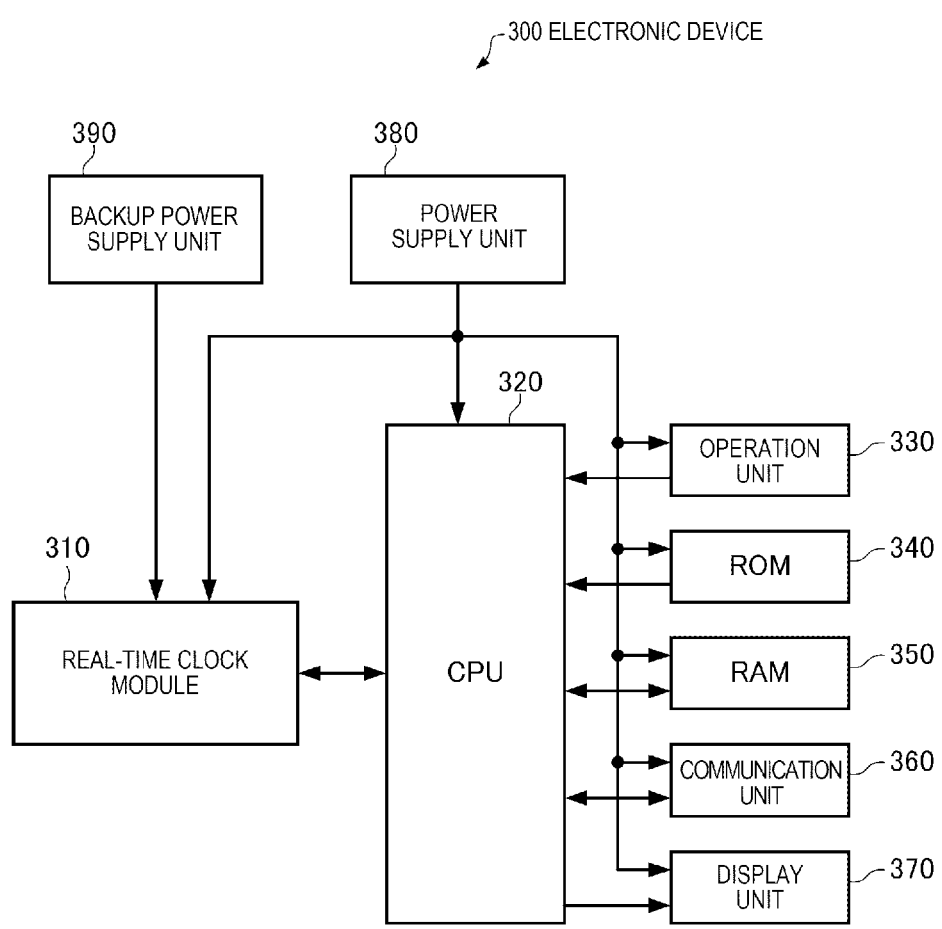
FIG. 13 is a functional block diagram illustrating an example of a configuration of an electronic device.
Figure 14:
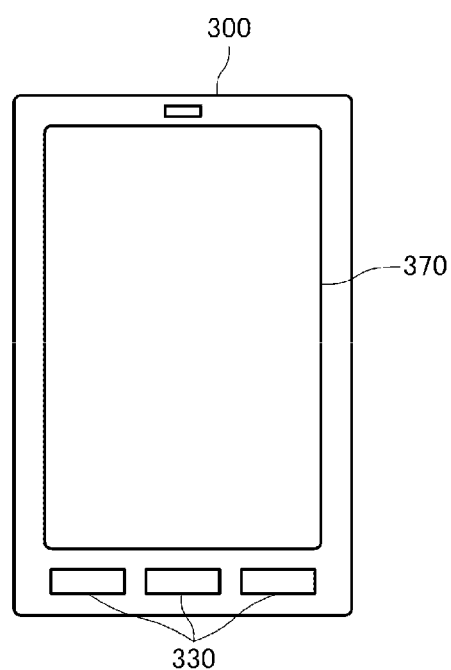
FIG. 14 illustrates an example of an appearance of a smartphone that is an example of an electronic device.

FIG. 13 is a functional block diagram illustrating an example of the configuration of an electronic device 300 according to the embodiment. FIG. 14 is a diagram illustrating an example of the appearance of a smartphone that is an example of the electronic device 300 according to the embodiment.

The electronic device 300 according to the embodiment includes a real-time clock (RTC) module 310, a central processing unit (CPU) 320, an operation unit 330, a read only memory (ROM) 340, a random access memory (RAM) 350, a communication unit 360, a display unit 370, a power supply unit 380, and a backup power supply unit 390. The electronic device 300 of the embodiment may be configured such that some of the components in FIG. 13 are omitted or changed, or other components are added.

The power supply unit 380 generates and outputs a power supply voltage that operates each unit of the electronic device 300. In addition, when the output of the power supply voltage from the power supply unit 380 is stopped due to an instantaneous power failure or the operation stop of the power supply unit 380, the backup power supply unit 390 generates and outputs a backup power supply voltage for maintaining the operating state of the electronic device 300.

The RTC module 310 includes a resonator (not illustrated) and a timing circuit. Then, based on the oscillation signal of the resonator, for example, a constant frequency signal of 32.786 kHz, timing data representing time in seconds or time in years, and the like are generated and output to the CPU 320.

The CPU 320 is a processing unit that performs various types of calculation processing and control processing using timing data input from the RTC module 310 according to a program stored in the ROM 340 or the like. In addition, the CPU 320 performs various types of processing according to operation signals from the operation unit 330, processing for controlling the communication unit 360 to perform data communication with an external device, and processing for transmitting display signals for displaying various types of information on the display unit 370.

The operation unit 330 is an input device configured with operation keys, button switches, and the like, and outputs an operation signal corresponding to an operation by a user to the CPU 320.

The ROM 340 is a storage unit that stores programs, data, and the like for the CPU 320 to perform various types of calculation processing and control processing.

The RAM 350 is used as a work area of the CPU 320, and is a storage unit that temporarily stores programs and data read from the ROM 340, data input from the operation unit 330, calculation results executed by the CPU 320 according to various programs, and the like.

The communication unit 360 performs various controls for establishing data communication between the CPU 320 and the external device.

The display unit 370 is a display device configured with a liquid crystal display (LCD) or the like, and displays various types of information based on a display signal input from the CPU 320. The display unit 370 may be provided with a touch panel that functions as the operation unit 330.

In a case where the voltage supplied to the RTC module 310 is switched from the power supply voltage supplied from the power supply unit 380 to the backup power supply voltage supplied from the backup power supply unit 390 by applying, for example, the RTC module 1 of each embodiment described above as the RTC module 310, it is possible to reduce the possibility that the voltage value of the constant voltage signal generated inside the RTC module 310 changes. Thereby, the highly reliable electronic device 300 can be realized.

Various electronic devices can be considered as such an electronic device 300, and examples thereof include personal computers such as mobile, laptop, and tablet computers, mobile terminals such as smartphones and mobile phones, digital cameras, ink jet dispensing devices such as ink jet printers, storage area network devices such as routers and switches, local area network equipment, mobile terminal base station equipment, TV, video cameras, video recorders, car navigation devices, real-time clock devices, pagers, electronic notebooks, electronic dictionaries, calculators, electronic game machines, game controllers, word processors, workstations, video phones, crime prevention TV monitors, electronic binoculars, POS terminals, medical equipment such as electronic thermometers, blood pressure monitors, blood glucose meters, electrocardiogram measuring devices, ultrasound diagnostic devices, and electronic endoscopes, fish detectors, measuring instruments, instruments such as vehicles, aircraft, and ships, flight simulators, head mounted displays, motion tracers, motion trackers, motion controllers, pedestrian dead reckoning (PDR) devices, and the like.

3. Vehicle

Figure 15:
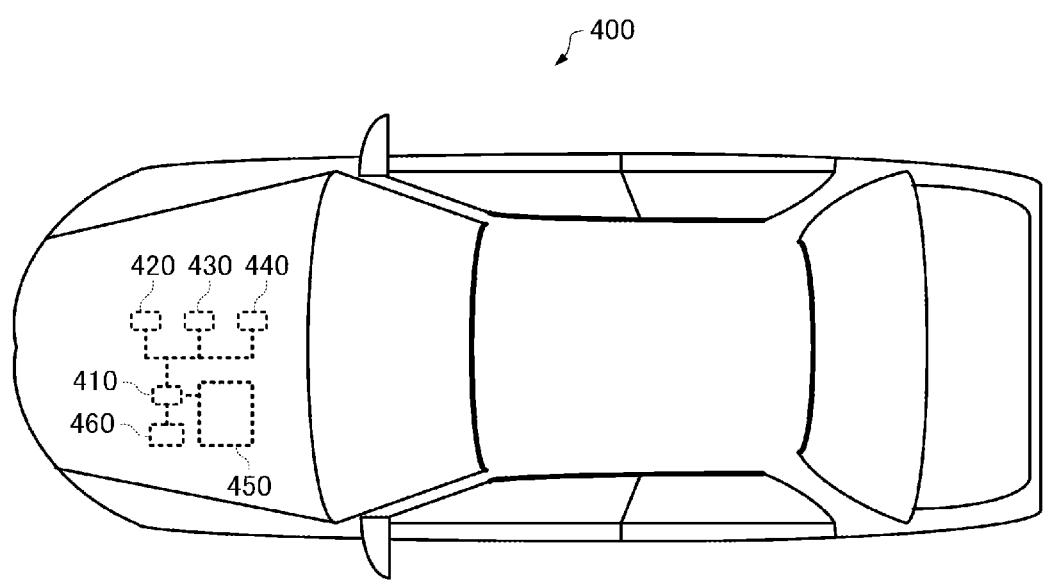
FIG. 15 is a diagram illustrating an example of a vehicle.

FIG. 15 is a diagram illustrating an example of a vehicle 400 according to the embodiment. The vehicle 400 illustrated in FIG. 15 is configured to include an RTC module 410, controllers 420, 430, and 440 that perform various controls such as an engine system, a brake system, and a keyless entry system, a battery 450, and a backup battery 460. The vehicle 400 of the embodiment may be configured such that some of the components in FIG. 15 are omitted or other components are added.

The RTC module 410 includes a resonator (not illustrated) and a timing circuit. Based on the oscillation signal of the resonator, for example, a constant frequency signal of 32.786 kHz, timing data representing time in seconds or time in years, and the like are generated and output from the external terminal of the RTC module 410 to the controllers 420, 430, and 440.

The battery 450 supplies power to the RTC module 410 and the controllers 420, 430, and 440. The backup battery 460 supplies power to the RTC module 410 and the controllers 420, 430, and 440 when the output voltage of the battery 450 is lower than a threshold.

In a case where the voltage supplied to the RTC module 410 is switched from the power supply voltage from the battery 450 to the backup power supply voltage from the backup battery 460 by applying, for example, the RTC module 1 of each embodiment described above as the RTC module 410, it is possible to reduce the possibility that the voltage value of the constant voltage signal generated inside the RTC module 410 changes. Thereby, the high reliable vehicle 400 can be realized.

As such a vehicle 400, various vehicles 400 can be considered, and examples thereof include automobiles such as electric cars, aircraft such as jets and helicopters, ships, rockets, and artificial satellites.

As described above, although the embodiments and modification example were described, the disclosure is not limited to these embodiments and can be implemented in various modes without departing from the scope of the disclosure. For example, the above-described embodiments can be appropriately combined.

The disclosure includes substantially the same configuration as the configuration described in the embodiments (for example, a configuration having the same function, method, and result, or a configuration having the same object and effect). In addition, the disclosure includes a configuration in which non-essential parts of the configuration described in the embodiments are replaced. In addition, the disclosure includes a configuration that may achieve the same effects as the configurations described in the embodiments or a configuration that may achieve the same object. In addition, the disclosure includes a configuration in which well-known techniques are added to the configurations described in the embodiments.

What is claimed is:

1. A real-time clock module comprising:
a first node to which a first power supply voltage is applied;
a second node to which a second power supply voltage is applied;
a switch circuit that is electrically coupled to the first node and the second node and switches between outputting the first power supply voltage and outputting the second power supply voltage;
a power supply detection circuit that detects a voltage value of the first power supply voltage;
a switch control circuit that controls the switching of the switch circuit based on an output of the power supply detection circuit;
a constant voltage circuit that outputs a constant voltage signal based on the output of the switch circuit; and
a current control circuit that controls a current supplied to the constant voltage circuit,
wherein, when the switch control circuit switches the switch circuit, the current control circuit increases the current supplied to the constant voltage circuit.

2. The real-time clock module according to claim 1, wherein, after the current control circuit increases the current supplied to the constant voltage circuit, the switch control circuit switches the switch circuit.

3. The real-time clock module according to claim 1, further comprising:
a first power-on reset circuit that outputs a first reset signal to the switch control circuit and the current control circuit,
wherein the constant voltage signal is input to the first power-on reset circuit.

4. The real-time clock module according to claim 1, wherein the constant voltage circuit includes a first transistor that controls a supplied current, and a second transistor that has a larger driving capability than the first transistor,
when the current supplied to the constant voltage circuit is increased, the current control circuit controls the first transistor and the second transistor to be turned on, and
when the current supplied to the constant voltage circuit is not increased, the current control circuit controls the first transistor to be turned on and the second transistor to be turned off.

5. The real-time clock module according to claim 1, further comprising:
a second power-on reset circuit that outputs a second reset signal in accordance with the voltage value of the first power supply voltage,
wherein the current control circuit controls the current supplied to the constant voltage circuit based on the second reset signal.

6. An electronic device comprising:
the real-time clock module according to claim 1.

7. A vehicle comprising:
the real-time clock module according to claim 1.

8. The real-time clock module according to claim 1, wherein the constant voltage circuit outputs the constant voltage signal at a constant and equal value regardless of which of the first power supply voltage and the second power supply voltage is output from the switch circuit.

9. The real-time clock module according to claim 8, wherein for each switching of the switch circuit by the switch control circuit, the current control circuit increases the current supplied to the constant voltage circuit before the switch control circuit switches the switch circuit and then removes the increase of the current supplied to the constant voltage circuit after the switch control circuit switches the switch circuit.

10. The real-time clock module according to claim 1, wherein for each switching of the switch circuit by the switch control circuit, the current control circuit increases the current supplied to the constant voltage circuit before the switch control circuit switches the switch circuit and then removes the increase of the current supplied to the constant voltage circuit after the switch control circuit switches the switch circuit.

* * * * *